United States Patent
Park et al.

(10) Patent No.: US 11,103,932 B2
(45) Date of Patent: Aug. 31, 2021

(54) CUTTING HEAD OPERATED BY CENTRIFUGAL FORCE AND CUTTING APPARATUS INCLUDING THE SAME

(71) Applicant: KOREA INSTITUTE OF MACHINERY & MATERIALS, Daejeon (KR)

(72) Inventors: Jong-Kweon Park, Daejeon (KR); Byung-Sub Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 16/573,979

(22) Filed: Sep. 17, 2019

(65) Prior Publication Data

US 2020/0086394 A1    Mar. 19, 2020

(30) Foreign Application Priority Data

Sep. 17, 2018  (KR) .................. 10-2018-0110903
Mar. 25, 2019  (KR) .................. 10-2019-0033522
Sep. 16, 2019  (KR) .................. 10-2019-0113803

(51) Int. Cl.
*B23B 29/034* (2006.01)
*B23Q 15/22* (2006.01)
(Continued)

(52) U.S. Cl.
CPC ........ *B23B 29/03496* (2013.01); *B23Q 15/22* (2013.01); *B23B 29/03428* (2013.01);
(Continued)

(58) Field of Classification Search
CPC .............. B23B 29/03485; B23B 41/12; B23B 29/03464; B23B 2260/108;
(Continued)

(56) References Cited

U.S. PATENT DOCUMENTS 8,950,300 B2 *  2/2015  Ebihara .................. B23B 29/12
                                                       82/1.5
10,391,564 B2 *  8/2019  Park .................. B23B 29/03485
(Continued)

FOREIGN PATENT DOCUMENTS

EP    3321021         5/2018
JP    56119365 A  *  9/1981  ............. B24B 33/08
(Continued)

OTHER PUBLICATIONS

EPO, European Search Report of EP 19197769.3 dated Mar. 3, 2020.
EPO, Written Opinion of EP 19197769.3 dated Mar. 3, 2020.

*Primary Examiner* — Eric A. Gates
*Assistant Examiner* — Paul M Janeski
(74) *Attorney, Agent, or Firm* — Lex IP Meister, PLLC

(57) ABSTRACT

A cutting head operated by a centrifugal force according to an embodiment of the present invention includes: an external housing that is rotatable; an internal housing installed within the external housing so as to be able to advance and retreat in a diameter direction, advanced toward a cut surface of a workpiece positioned outside the external housing by a centrifugal force according to rotation of the external housing, and retreated in a direction that becomes distant from the cut surface by an elastic member while the centrifugal force disappears; and a cutting tool unit provided in the internal housing and processing a groove in the cut surface while being advanced and retreated by a micro advance and retreat member.

20 Claims, 33 Drawing Sheets

(51) Int. Cl.
 *B23Q 17/22* (2006.01)
 *B23B 41/12* (2006.01)
(52) U.S. Cl.
 CPC ... *B23B 29/03464* (2013.01); *B23B 29/03485* (2013.01); *B23B 41/12* (2013.01); *B23B 2260/108* (2013.01); *B23B 2270/04* (2013.01); *B23Q 17/22* (2013.01)
(58) Field of Classification Search
 CPC .......... B23B 29/03496; B23B 2270/04; B23Q 17/22; B23Q 15/22
 See application file for complete search history.

(56) References Cited

U.S. PATENT DOCUMENTS

| | | | |
|---|---|---|---|
| 10,744,570 B2 * | 8/2020 | Lemoine | ........... B23B 29/03457 |
| 2005/0166727 A1 | 8/2005 | Peltonen et al. | |

FOREIGN PATENT DOCUMENTS

| | | |
|---|---|---|
| JP | 05-337391 | 12/1993 |
| JP | 2012091251 | 5/2012 |
| JP | 3204726 | 6/2016 |
| KR | 1020050112472 | 11/2005 |
| KR | 2012-091251 | 8/2012 |
| KR | 1020150073710 | 7/2015 |
| KR | 101692249 | 1/2017 |
| KR | 1020170117733 | 10/2017 |
| KR | 10-1954225 | 3/2019 |
| KR | 101998117 | 7/2019 |
| KR | 20190113803 | 10/2019 |

* cited by examiner

A-A Section

FIG. 5
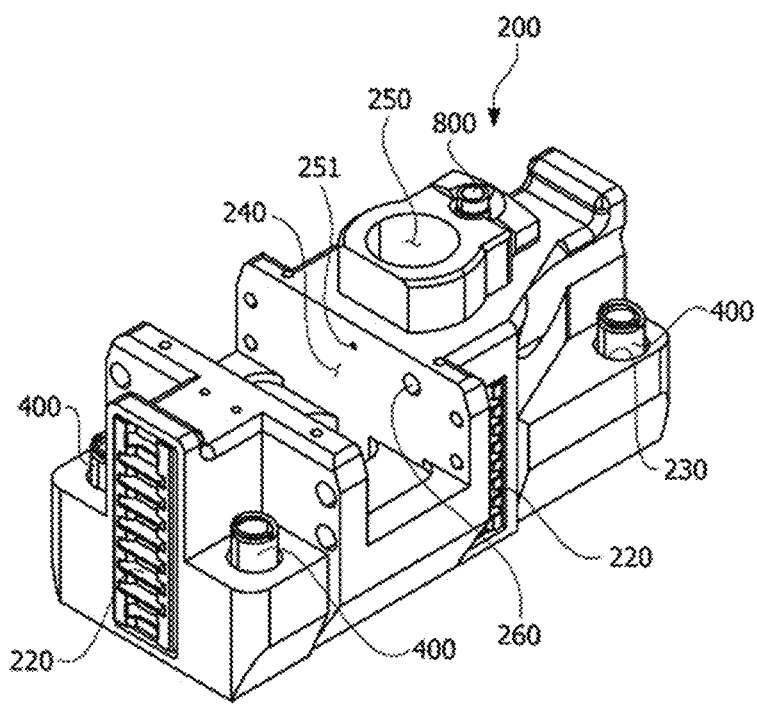
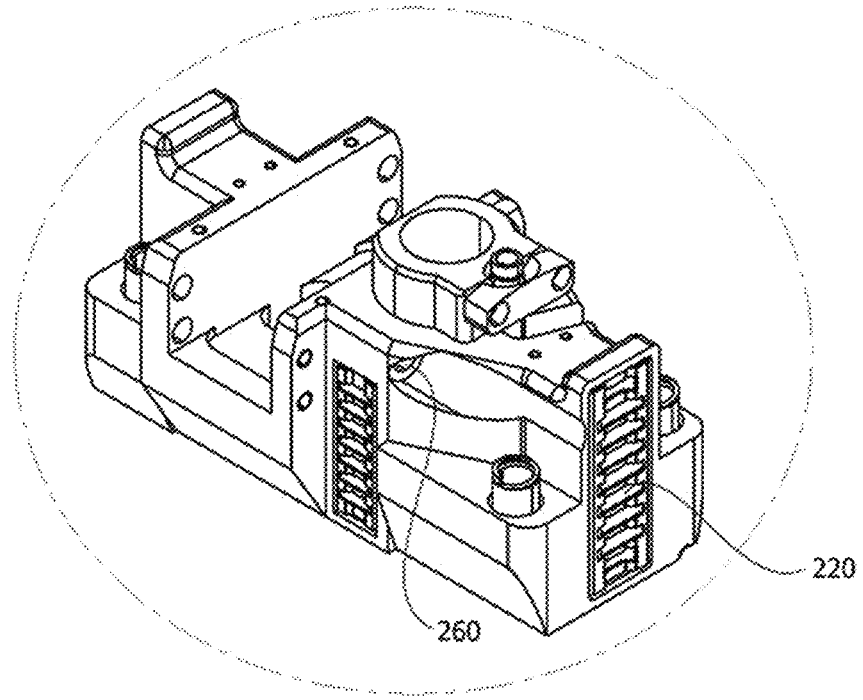

FIG. 8
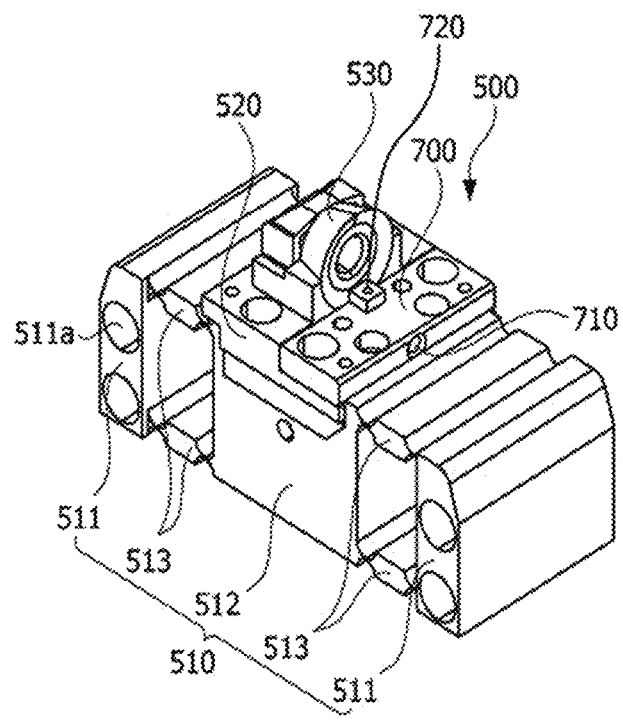
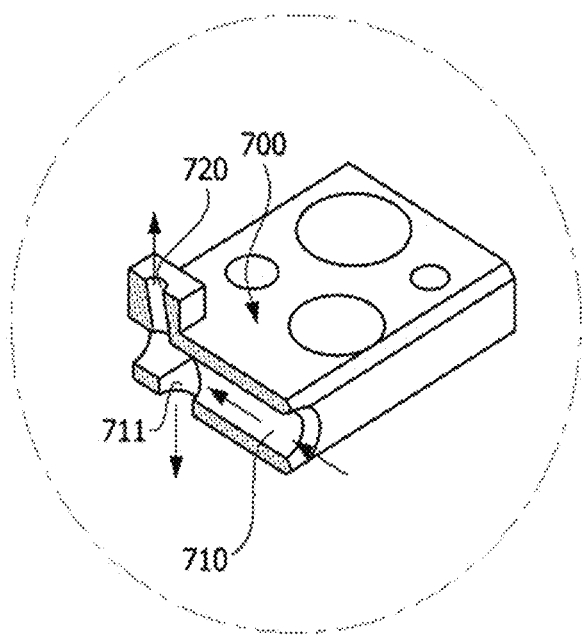

FIG. 13
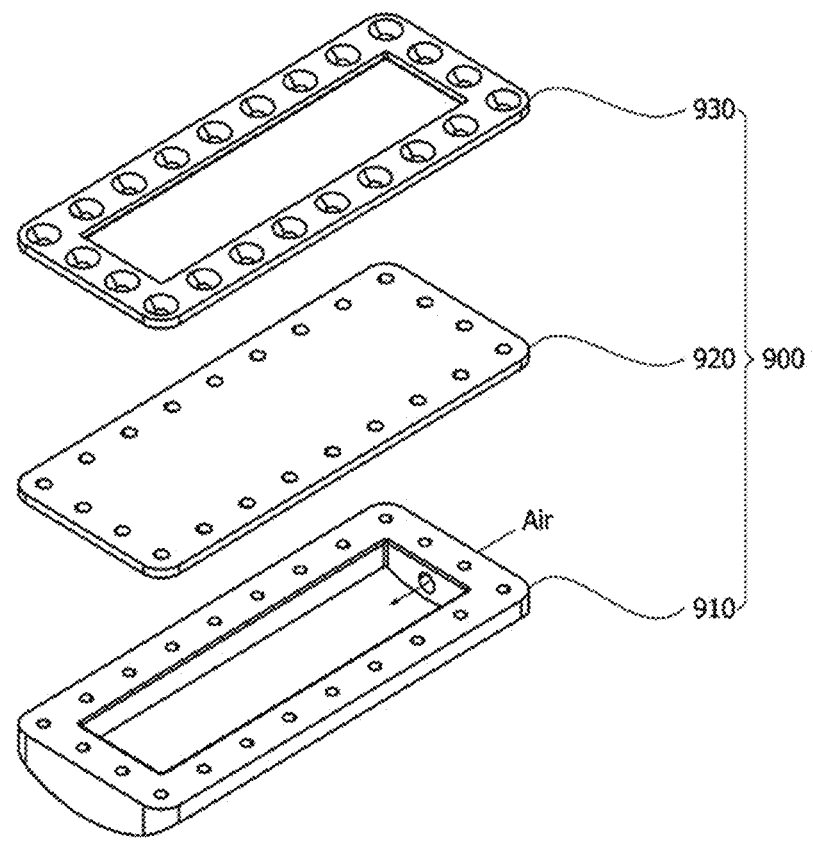
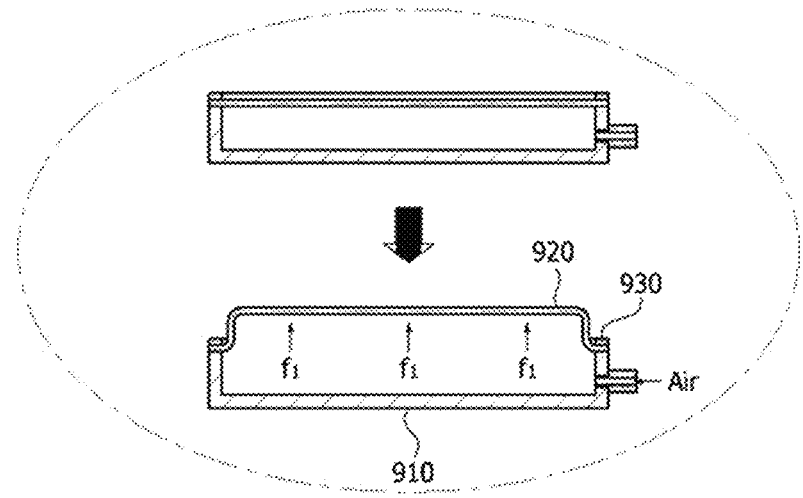

CONSTRAINT : X, Y, A, B, C
FREE : Z

CUTTING HEAD OPERATED BY CENTRIFUGAL FORCE AND CUTTING APPARATUS INCLUDING THE SAME

CROSS-REFERENCE TO RELATED APPLICATION

This application claims priority to and the benefit of Korean Patent Application No. 10-2018-0110903 filed in the Korean Intellectual Property Office on Sep. 17, 2018, Korean Patent Application No. 10-2019-0033522 filed in the Korean Intellectual Property Office on Mar. 25, 2019, and Korean Patent Application No. 10-2019-0113803 filed in the Korean Intellectual Property Office on Sep. 16, 2019, the entire contents of which are incorporated herein by reference.

BACKGROUND OF THE INVENTION

(a) Field of the Invention

The present invention relates to a cutting head operated by a centrifugal force and a cutting apparatus including the same. More particularly, the present invention relates to a cutting head in which a cutting tool is advanced toward a workpiece by a centrifugal force when the cutting head is rotated for cutting and the cutting tool is retreated in a direction that becomes distant from the workpiece when the cutting head is stopped after the cutting ends, and a cutting apparatus including the same.

(b) Description of the Related Art

A bore surface of a cylinder block is honed to secure a predetermined level of surface roughness. Fine patterns in a micro unit serving as oil grooves are formed on the honed bore surface, an oil film is formed on the bore surface by these fine patterns. The oil film serves to minimize friction at the time of piston movement.

As described above, the fine patterns are fine in the micro unit, and should thus be processed by a precise cutting apparatus. In this regard, the present applicant has proposed a fine pattern processing apparatus in U.S. Patent Publication No. 10391564 (Related Art Document 1).

A hybrid cutting apparatus disclosed in Related Art Document 1 has a structure in which protrusion degrees of grooving tools forming fine patterns in common are primarily adjusted in a large width by a harmonic drive and then secondarily adjusted in a small width by a piezo actuator.

However, in a case of the configuration described above, the harmonic drive itself that is commercially available is expensive, and a manufacturing cost of applying the harmonic drive to the hybrid cutting apparatus is also expensive, which causes an increase in cost of the cutting apparatus. Therefore, an alternative configuration capable of substituting for a role of an existing harmonic drive and performing precise cutting has been required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a cutting head operated by a centrifugal force having advantages of substituting for a role of an existing harmonic drive at low cost by implementing a technology of allowing a cutting tool to become close to a workpiece by a centrifugal force generated at the time of rotation of the cutting head and allowing the cutting tool to return to an original position when the centrifugal force disappears.

Further, the present invention has been made in an effort to provide a cutting apparatus including the cutting head described above.

Objects of the present disclosure are not limited to the above-mentioned objects. That is, other objects that are not mentioned may be obviously understood by those skilled in the art to which the present invention pertains.

An exemplary embodiment of the present invention provides a cutting head operated by a centrifugal force including: an external housing that is rotatable; an internal housing installed within the external housing so as to be able to advance and retreat in a diameter direction, advanced toward a cut surface of a workpiece positioned outside the external housing by a centrifugal force according to rotation of the external housing, and retreated in a direction that becomes distant from the cut surface by an elastic member while the centrifugal force disappears; and a cutting tool unit provided in the internal housing and processing a groove in the cut surface while being advanced and retreated by a micro advance and retreat member.

The cutting head operated by a centrifugal force may further include a contact member provided in the internal housing and having a tip in contact with the cut surface by an advance operation of the internal housing, wherein the cutting tool unit is advanced and retreated by the micro advance and retreat member in a state in which the tip of the contact member is first in contact with the cut surface.

The internal housing may be advanced and retreated through guide rollers provided on each side surface of the internal housing in a state in which the internal housing closely adheres to an inner surface of the external housing by wedges.

The cutting head operated by a centrifugal force may further include a centrifugal force supplement member pushing the internal housing toward the cut surface.

The cutting tool unit may include: a straight movement inducing block seated in the internal housing and advanced and retreated by the micro advance and retreat member; a tool holder block seated on the straight movement inducing block and induced to straightly move by the straight movement inducing block; and a cutting tip supported to the tool holder block and forming the groove in the cut surface of the workpiece.

The straight movement inducing block may include: fixed blocks fixed to the internal housing; a straight movement block advanced and retreated by power of the micro advance and retreat member; and elastic blocks elastically connecting the fixed blocks and the straight movement block to each other so that straight movement of the straight movement block is induced.

The elastic blocks may have a plate-shaped structure, notch portions having a thickness smaller than that of other portions may be formed at end portions of the elastic blocks connected to the fixed blocks and the straight movement block, and the elastic blocks may be elastically deformed by the notch portions.

The cutting tip may be supported to the tool holder block so as to be rotatable on its axis, and may rotate on its axis by a cutting moment generated at the time of cutting the workpiece.

The tool holder block may include: a first holder block provided with a seating groove on which the cutting tip is seated and provided with a tip shaft disposed at one side of the seating groove and loosely coupled to a shaft hole of the cutting tip; a second holder block supporting a part of the cutting tip; and a pressing member elastically pressing the cutting tip toward the first holder block 521 with being installed in the second holder block.

When viewing the cutting tip on a plane, an extension line of the cutting tip in a diameter direction may be disposed so as to form an acute angle with respect to an extension line of the external housing in a rotation shaft direction.

The contact member may include: a ball housing screwed into the internal housing to be capable of adjusting a protrusion degree thereof from the internal housing according to a rotation operation; a contact ball embedded in a tip of the ball housing so as to be partially exposed to be in contact with the cutting surface by the centrifugal force of the external housing; a retainer supporting a lower part of the contact ball with being slidably installed in the ball housing; and a lifting bolt supporting the retainer within the ball housing and screwed to an inner peripheral surface of the ball housing to lift the retainer toward the contact ball according to a rotation operation.

The contact member may further include a ball spring interposed in a compressed state between the retainer and the lifting bolt and pushing the retainer outwardly with a predetermined pressure.

The micro advance and retreat member may include a piezo-actuator, and the piezo-actuator may include: a piezo having one end grounded to the straight movement block and the other end grounded to the internal housing and advancing the straight movement block while being expanded in a length direction when power is applied thereto; a connection shaft connecting the straight movement block and the internal housing to each other and advanced in an advance direction of the straight movement block in conjunction with the expansion of the piezo; and a retreating member retreating the straight movement block by pulling the connection shaft when the piezo is powered off.

The cutting head operated by a centrifugal force may further include a stopping block installed in the external housing and limiting a maximum advance distance of the internal housing, wherein the cutting tool unit is installed at a central portion of the internal housing and is advanced toward the cut surface by the micro advance and retreat member in a state in which the internal housing is stopped by the stopping block.

The internal housing may have a hexahedral shape, and a surface of the internal housing on which the cutting tip is disposed and a back surface thereof may have a square shape.

The cutting head operated by a centrifugal force may further include guide rollers provided on support surfaces having chamfered forms of rectangular corners sides of the internal housing and arranged symmetrically to each other with respect to the cutting chip while intersecting with each other in a diagonal direction.

The stopping block may include: a pair of block bodies coupled to both sides of the internal housing installation unit, respectively; stoppers each provided on the pair of block bodies and limiting an advance distance of the internal housing; and constraint rods each provided on the pair of block bodies and preventing separation of the elastic member.

The stoppers may be configured so that protrusion degrees thereof from each of the pair of block bodies are adjusted.

The straight movement block may be supported on all sides thereof by the elastic blocks so that a degree of freedom is limited in remaining directions excluding a straight movement direction The straight movement block may have a rectangular shape, and the elastic blocks may be disposed at each corner of the straight movement block having the rectangular shape and be disposed in an oblique direction so as to be symmetrical to each other with respect to a center of the straight movement block.

Another exemplary embodiment of the present invention provides a cutting apparatus including: the cutting head operated by a centrifugal force as described above; a buffer unit coupled to a distal end of the cutting head and including a buffer chamber keeping an air pressure of air introduced into the cutting head constant; and a main body unit coupled to a distal end of the buffer unit and including first and second air supply ports supplying air to the cutting head and the buffer chamber and a control unit controlling an advance and retreat distance of the micro advance and retreat member.

According to an exemplary embodiment of the present invention, a technology of allowing a cutting tool to become close to a workpiece while protruding by a centrifugal force generated at the time of rotation of a cutting head is precisely implemented to substitute for an expensive harmonic drive that has been used in order to allow the cutting head to become close to the workpiece in the related art, such that a manufacturing cost of the cutting head may be reduced.

In addition, according to an exemplary embodiment of the present invention, when rotation of the cutting head is stopped, the centrifugal force disappears, such that the cutting tool returns to an original position. Therefore, the cutting head may be easily withdrawn without colliding with an inner surface of a corresponding cylinder bore and may be easily introduced into another adjacent cylinder bore, such that automation of a cutting process may be constructed.

It is to be understood that effects of the present invention are not limited to the effects described above, and include all the effects that may be deduced from configurations of the present invention described in a detailed description or claims of the present invention.

BRIEF DESCRIPTION OF THE DRAWINGS

FIG. 5 is detailed views of an internal housing according to a first exemplary embodiment of the present invention and two views viewed from different angles.

FIG. 8 is a perspective view illustrating an example of a cutting tool unit according to a first exemplary embodiment of the present invention and a cross-sectional perspective view of a cooling block.

FIG. 13 is an exploded perspective view and a cross-sectional view of an operating state of a centrifugal force supplement member according to a first exemplary embodiment of the present invention.

DETAILED DESCRIPTION OF THE EMBODIMENTS

Figure 1:
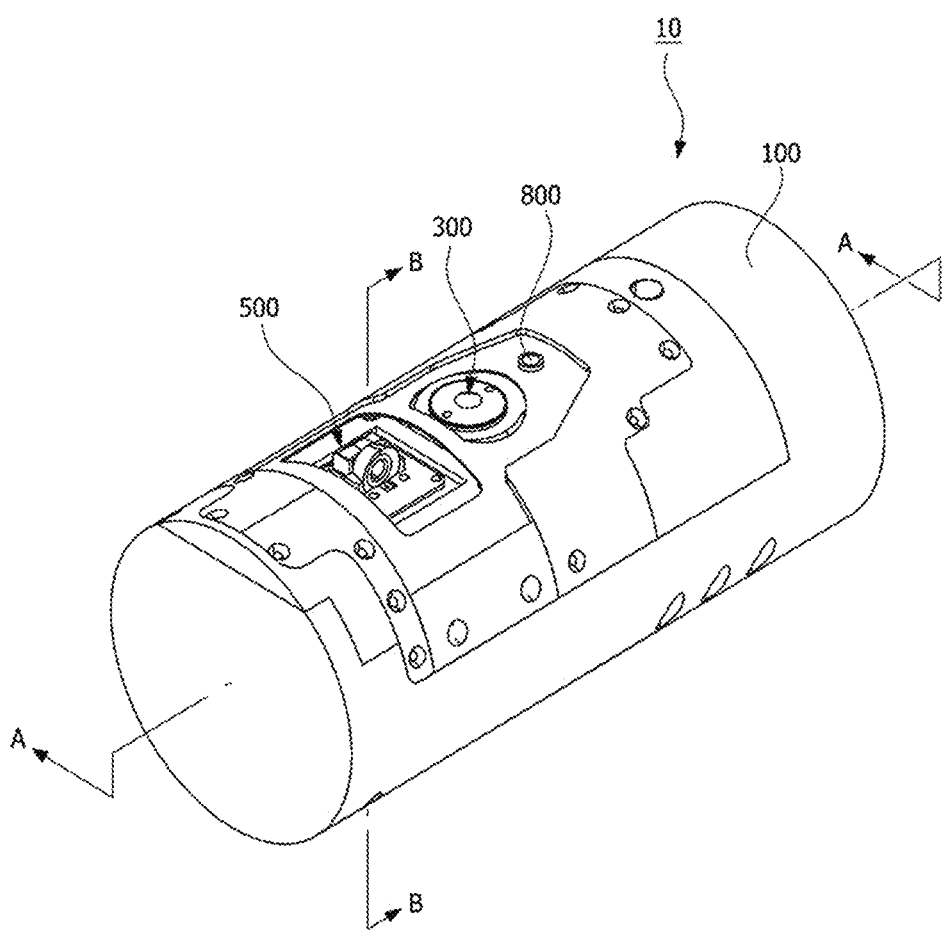
FIG. 1 is an assembled perspective view of a cutting head according to a first exemplary embodiment of the present invention.

Hereinafter, exemplary embodiments of the present invention will be described in detail with reference to the accompanying drawings so that those skilled in the art to which the present invention pertains may easily practice the present invention. As those skilled in the art would realize, the described embodiments may be modified in various different ways, all without departing from the scope of the present invention.

The drawings and description are to be regarded as illustrative in nature and not restrictive. Like reference numerals designate like elements throughout the specification.

In addition, since sizes and thicknesses of the respective components illustrated in the drawings are arbitrarily illustrated for convenience of explanation, the present invention is not necessarily limited to those illustrated in the drawings.

Throughout the present specification, when any portion is referred to as being "connected to" another portion, it includes a case in which any portion and another portion are "indirectly connected to" each other with the other portion interposed therebetween as well as a case in which any portion and another portion are "directly connected to" each other. In addition, throughout the present specification, unless explicitly described to the contrary, the word "comprise" and variations such as "comprises" or "comprising", will be understood to imply the inclusion of stated elements but not the exclusion of any other elements.

A cutting head according to an exemplary embodiment of the present invention implements a primary advance and retreat action of a cutting tool that a harmonic drive has been in charge of in the related art, using a centrifugal force generated according to rotation of the cutting head.

That is, in the cutting head according to an exemplary embodiment of the present invention, a cutting tool unit is installed in the cutting head so as to move in a diameter direction, such that when the cutting head rotates, the cutting tool unit advances so as to protrude outwardly of the cutting head by a centrifugal force, and when the cutting head is stopped, the centrifugal force disappears, and the cutting tool unit thus returns to an original position by an elastic member pulling the cutting head inwardly.

A cutting head according to a first exemplary embodiment of the present invention will be described with reference to FIGS. 1 to 17.

A cutting head 10 according to the present exemplary embodiment includes an external housing 100, an internal housing, a contact member 300, a cutting tool unit 500, and a micro advance and retreat member 600, as illustrated in FIGS. 1 to 4.

Figure 2:
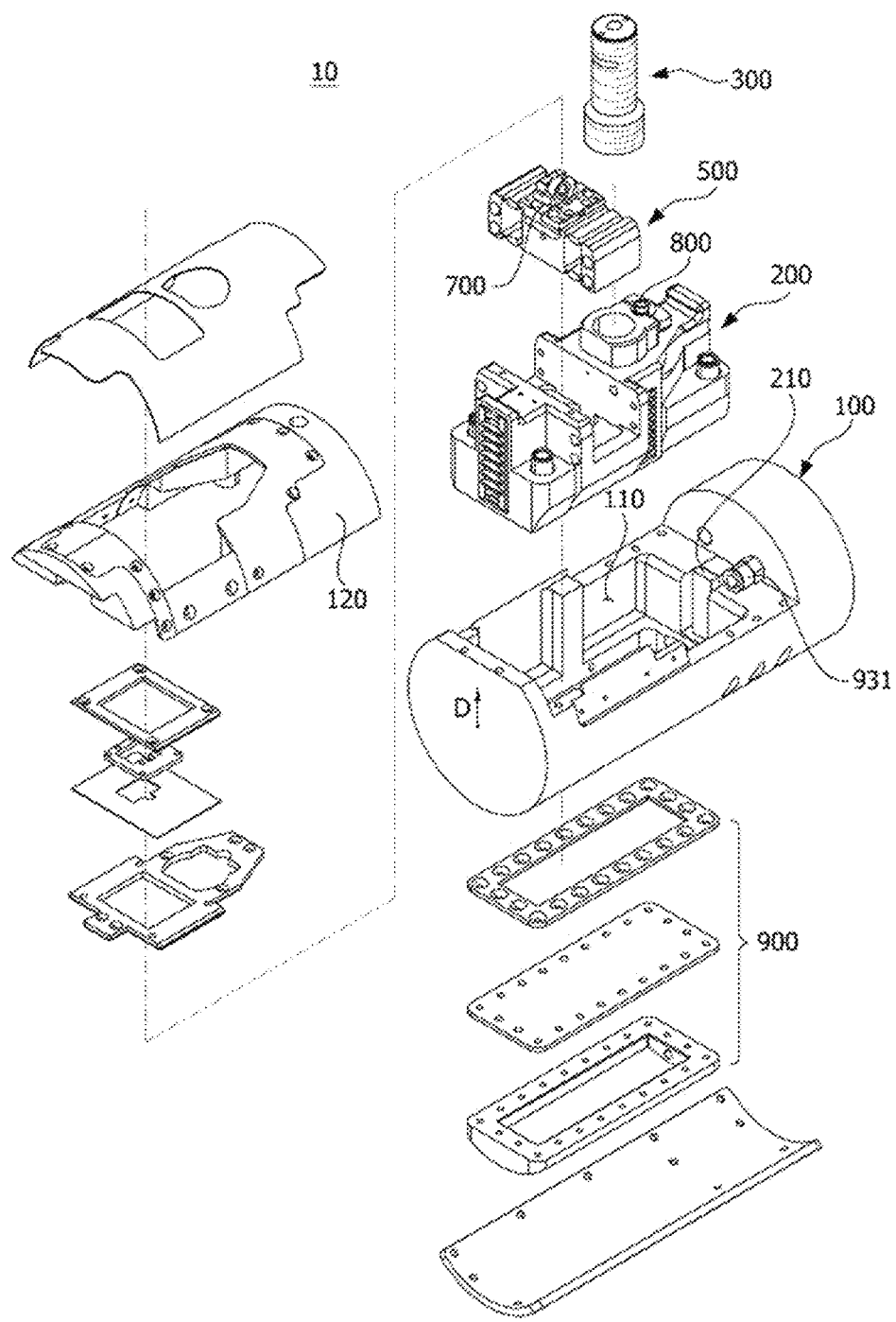
FIG. 2 is an entire exploded perspective view of the cutting head according to a first exemplary embodiment of the present invention.
Figure 3:
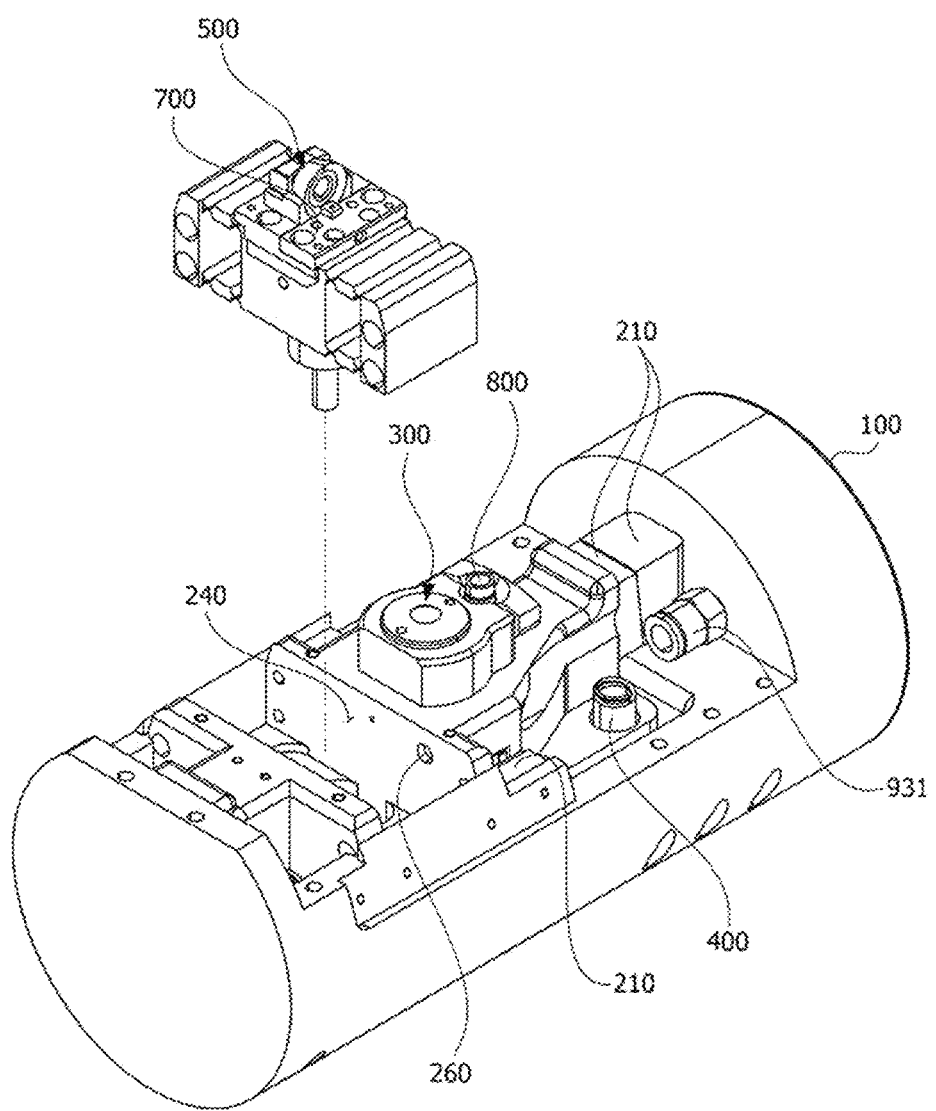
FIG. 3 is a partially exploded perspective view of a cutting head according to a first exemplary embodiment of the present invention.

The external housing 100 may have a cylindrical shape as illustrated in FIGS. 1 and 2, and an internal housing installation portion 110 into which the internal housing 200 is inserted may be provided inside the external housing 100.

The internal housing 200 is installed in the internal housing installation portion 110 of the external housing 100 so as to be able to advance and retreat in a diameter direction (a D direction in FIG. 2) of the external housing, as illustrated in FIGS. 2 and 5.

The internal housing 200 is advanced toward a workpiece 1 (see FIG. 4) by a centrifugal force generated as the external housing rotates, and returns to an original position by an expansion force of an elastic member 400 to be described below when the external housing 100 is stopped, such that the centrifugal force disappears.

Here, when the internal housing 200 is advanced or retreated, a straight movement property and friction reduction need to be considered.

First, with regard to a problem of the straight movement property, by considering that straight movement is possible only when a gap is not present between an external surface of the internal housing 200 and a wall surface of the internal housing installation portion 110, wedges 210 are press-fitted into two places in a front and rear direction and a left and right direction between the external surface of the internal housing 200 and the wall surface of the internal housing installation portion 110 to allow the internal housing 200 to closely adhere to the wall surface of the internal housing installation portion 110. Therefore, it is ensured that the internal housing 200 stably straightly moves forward, backward, leftward, and rightward without the gap within the internal housing installation portion 110.

Next, with regard to a problem of the friction reduction, guide rollers 220 are installed at four places of the front, the back, the left, and the right of the internal housing 200, and may be moved in a rolling motion along the wall surface of the internal housing installation portion 110 and the wedges 210 to reduce friction.

Figure 15:
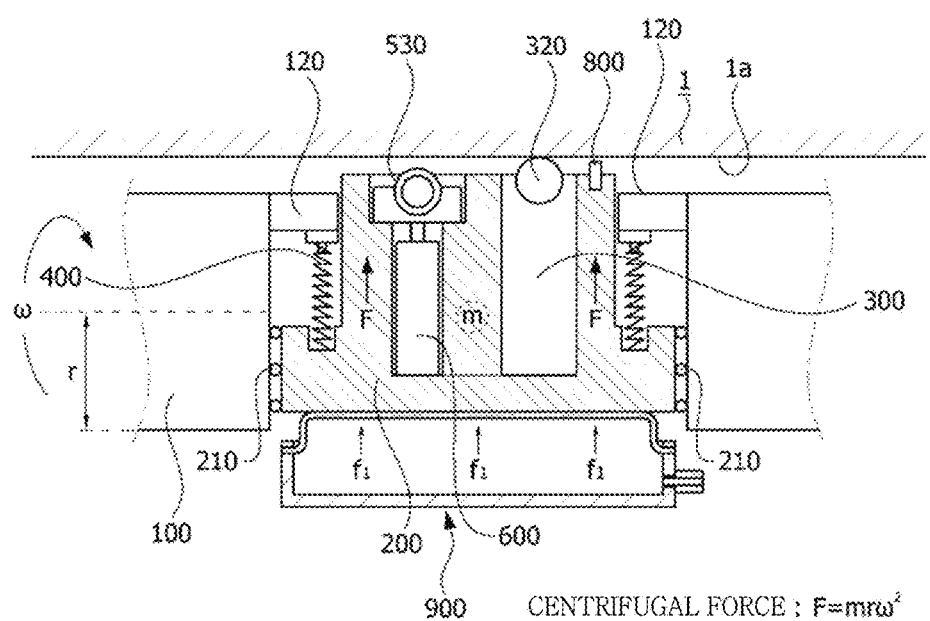
FIG. 15 is a schematic diagram illustrating an operation process of the cutting head (internal housing) according to a first exemplary embodiment of the present invention and is a state diagram during an operation.
Figure 16:
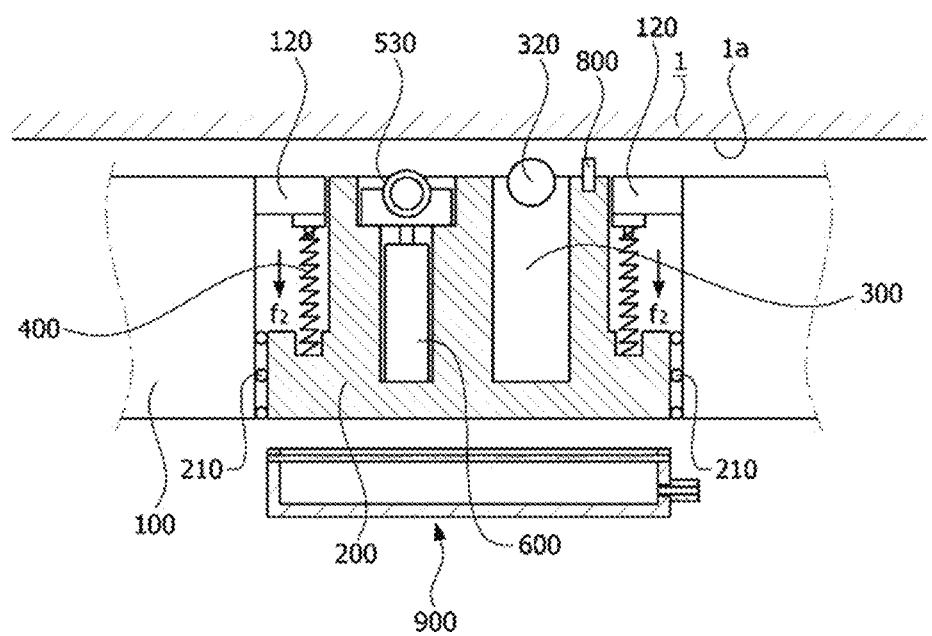
FIG. 16 is a schematic diagram illustrating an operation process of the cutting head (internal housing) according to a first exemplary embodiment of the present invention and is a state diagram in which an operation is completed.

In addition, spring pockets 230 into which electric members 400 such as coil springs are inserted may be provided at upper sides of each corner of the internal housing 200, as illustrated in FIG. 5. Here, lower ends of the elastic members 400 are supported to the spring pockets 230 and upper ends of the elastic members 400 are supported to a spring cover 120 (see FIG. 2) coupled to the external housing 100. Therefore, in a case in which a centrifugal force acts, the internal housing 200 is advanced to the workpiece 1 and is thus compressed, as illustrated in FIG. 15, and when the centrifugal force disappears, the internal housing 200 returns to the original position by an expansion force $f_2$ of the elastic members 400, as illustrated in FIG. 16.

In addition, a cutting tool unit installation portion 240 in which the cutting tool unit 500 is installed and a contact member installation portion 250 in which the contact member 300 is installed may be provided at adjacent positions, respectively, in the internal housing 200.

In addition, an air injection port 260 for injecting air into the cutting tool unit installation portion 240 may be provided at one side of the internal housing 200. The air injected into the air injection port 260 is introduced into each of the cutting tool unit 500 and the contact member 300, the air introduced into the cutting tool unit 500 cools cutting heat generated at the time of cutting, and the air introduced into the contact member 300 serves to lubricate a rolled contact ball (to be described below).

Figure 4:
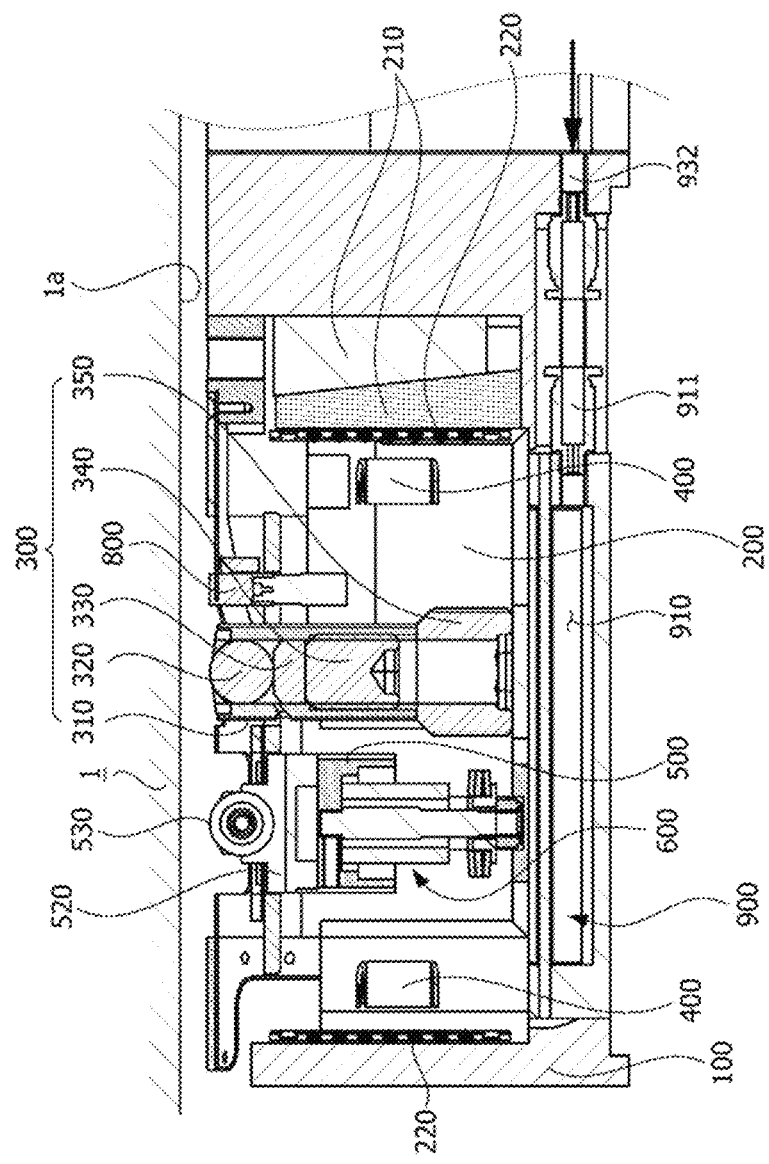
FIG. 4 is a cross-sectional view taken along line A-A of FIG. 1.
Figure 6:
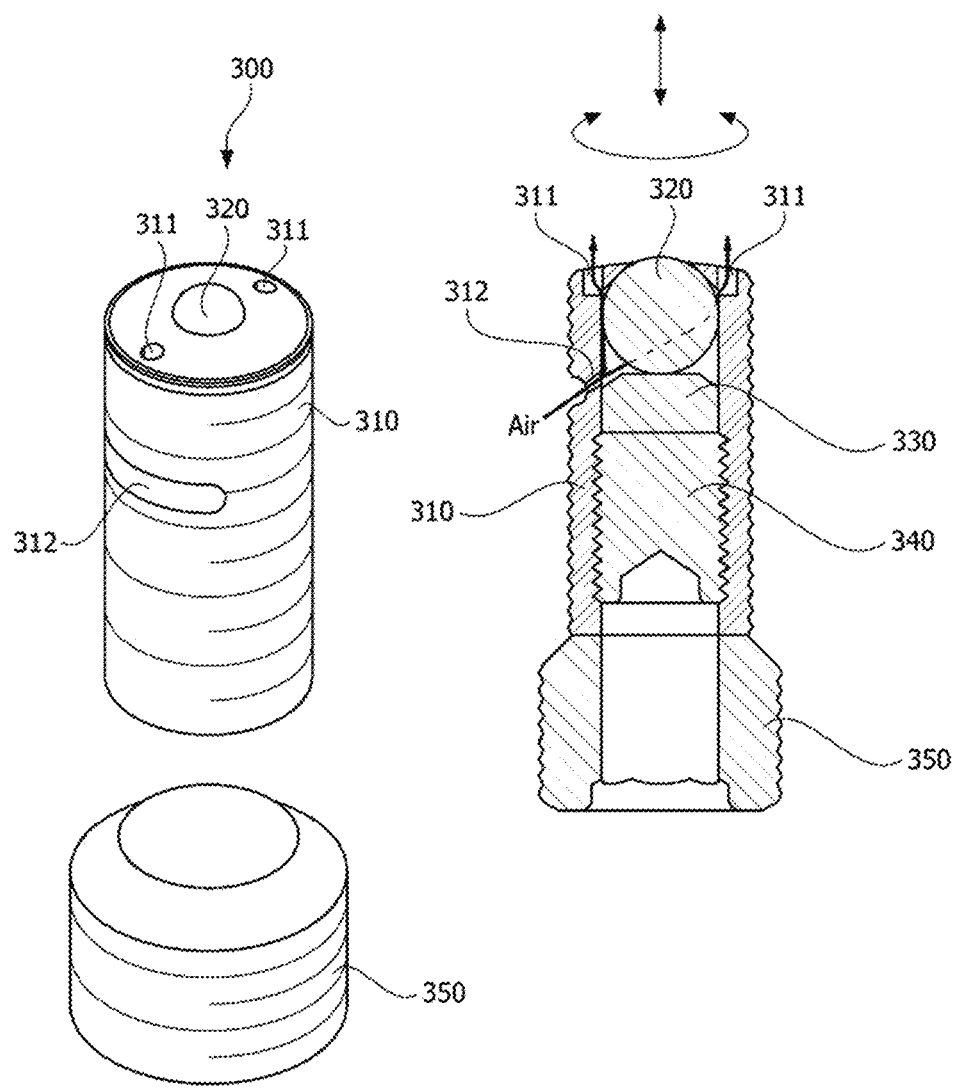
FIG. 6 is an exploded perspective view and an assembled cross-sectional view illustrating an example of a contact member according to a first exemplary embodiment of the present invention.

The contact member 300 may be provided in the contact member installation portion 250, as illustrated in FIGS. 4 to 6, and a tip of the contact member 300 serves to be in contact with a cut surface 1a of the workpiece 1 according to an advancing operation of the internal housing 200. In detail, a contact ball 320 of the contact member 300 is maintained in a state in which it is grounded to the cut surface 1a by the centrifugal force generated by the rotation of the internal housing 200, and serves to guide a cutting scheduled surface so that a cutting tip 530 performs stable processing while rolling according to a shape of the cut surface.

Here, the tip of the contact member 300 further protrudes as compared with a tip of the cutting tool unit 500, and is thus in contact with the cut surface 1a prior to the cutting tip 530 of the cutting tool unit 500 at the time of an advancing operation of the internal housing 200. Therefore, the contact member 300 serves to keep a distance between the cutting tip 530 and the cut surface 1a constant, and stability and accuracy may thus be ensured at the time of a cutting work of the cutting tip 530.

In addition, since the contact ball 320, which is the tip of the contact member 300, is first in contact with the cut surface 1a, the cutting tip 530 of the cutting tool unit 500 is not in contact with the cut surface 1a, such that damage to an edge of the cutting tip 530 may be prevented. Further, impact is not transferred to the micro advance and retreat member 600 finely advancing and retreating the cutting tip 530, such that damage of the micro advance and retreat member may be prevented.

The contact member 300 may include a ball housing 310 screwed into the contact member installation portion 250 of the internal housing 200 to be capable of adjusting a protrusion degree thereof from the internal housing according to a rotation operation, the contact ball 320 embedded in a tip of the ball housing so as to be partially exposed to the outside to be in contact with the cut surface 1a prior to the cutting tool unit 500 by the centrifugal force of the external housing 100, a retainer 330 supporting a lower part of the contact ball with being slidably embedded in the ball housing, a lifting bolt 340 supporting the retainer 330 within the ball housing and screwed to an inner peripheral surface of the ball housing to lift the retainer according to a rotation operation, and an end block nut 350 supporting a lower part of the ball housing 310 with being screwed into the internal housing 200.

Here, tool grooves 311 may be provided in an upper surface of the ball housing 310. When dedicated tools are mounted in the tool grooves 311 and then rotates in a specific direction as illustrated in a right drawing of FIG. 6, the ball housing 310 is linearly moved outwardly or inwardly of the contact member installation portion 250 while being spirally rotated, and the protrusion degree may thus be adjusted. Therefore, it may be usefully utilized when adjusting a gap between a tip of the cutting tip 530 and a tip of the contact ball 320.

Since the contact ball 320 is continuously in contact with the cut surface 1a and the retainer 330, wear may be generated at the time of using the contact ball for a long period of time. In this case, a protrusion degree of the contact ball 320 may be depressed inwardly of the ball housing 310 and be reduced as compared with a first state. In this case, the lifting bolt 340 may be rotated by a tool to push the retainer 330 outwardly of the contact member installation portion 250, thereby correcting the protrusion degree of the contact ball 320.

A cooling hole 312 (see FIG. 6) allowing air to be introduced toward the contact ball 320 to cool frictional heat of the contact ball 320 and serving as air lubrication of the contact ball 320 to reduce the wear of the contact ball may be formed to penetrate through a sidewall of the ball housing 310.

Figure 7:
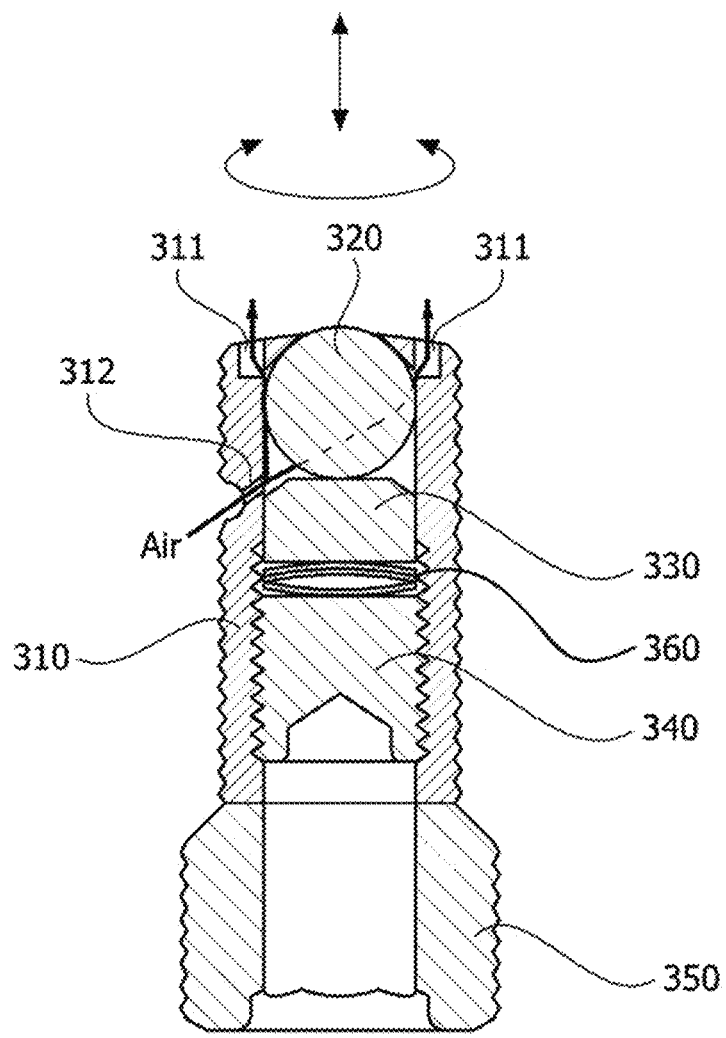
FIG. 7 is an assembled cross-sectional view illustrating another example of a contact member according to a first exemplary embodiment of the present invention.

Meanwhile, FIG. 7 illustrates another example of a contact member 300. The contact member 300 illustrated in FIG. 7 has the same configurations as those of the contact member described above except that a ball spring 360 is interposed in a compressed state between the retainer 330 and the lifting bolt 340. The ball spring 360 may push the retainer 330 outwardly with a predetermined elastic force to keep a protrusion degree of the contact ball 320 constant even though the contact ball 320 supported by the retainer 330 is worn due to repeated contact with the cut surface 1a.

Figure 12:
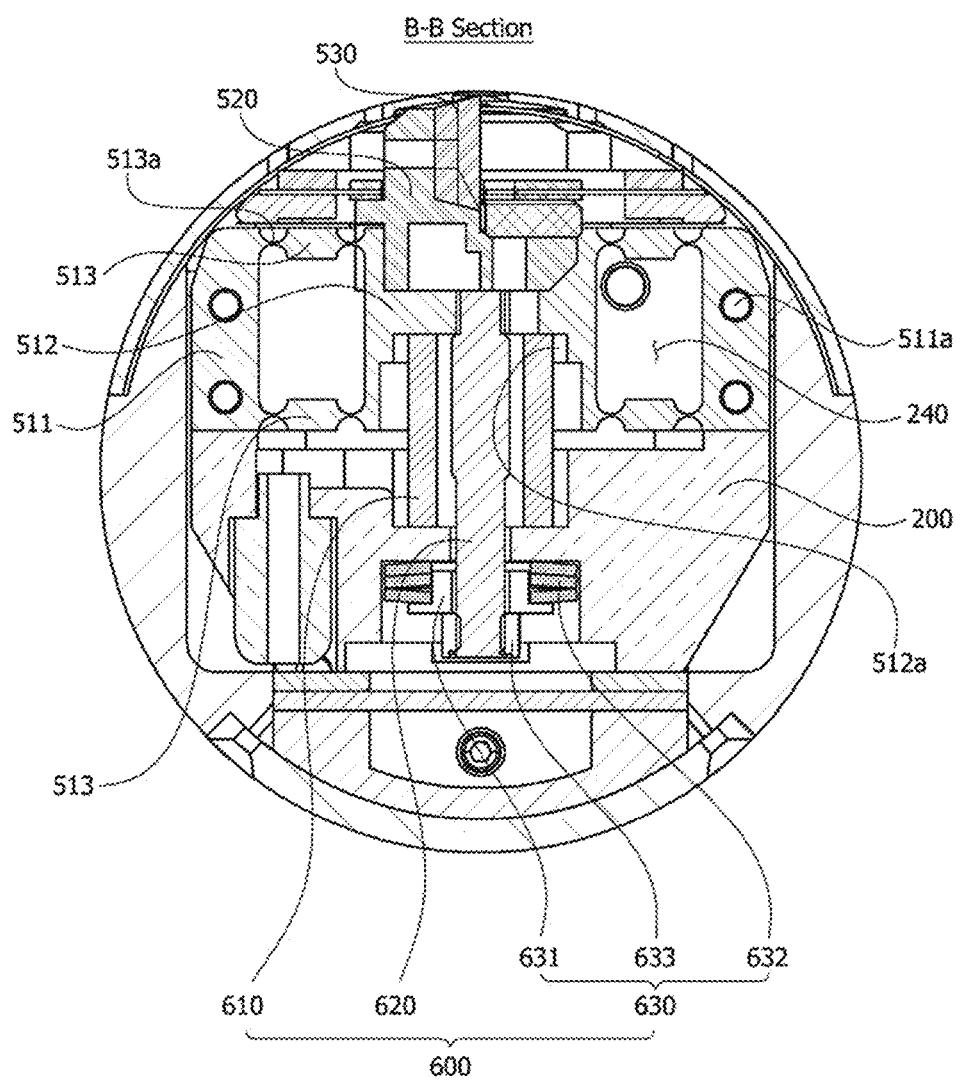
FIG. 12 is a cross-sectional view taken along line B-B of FIG. 1.

The cutting tool unit 500 is provided in the internal housing 200 and serves to cut a groove (oil dimple) in the cut surface while being finely advanced and retreated by the micro advance and retreat member 600 in a state in which the contact member 300 is in contact with the cut surface 1a, as illustrated in FIGS. 4, 8, and 12, The cutting tool unit 500 may include a straight movement inducing block 510 (see FIG. 8) seated in the internal housing 200, a tool holder block 520 seated on a straight movement block 512 (to be described below) of the straight movement inducing block, and the cutting tip 530 forming the groove (oil dimple) in the cut surface 1a of the workpiece 1 while being induced to straightly move by the straight movement block with being supported to the tool holder block.

Here, a cooling block 700 for discharging cooling air toward the cutting tip while partially supporting the cutting tip 530 may be installed on one side of an upper surface of the tool holder block 520. The cooling block 700 has an air channel 710 into which air for cooling is introduced and an air discharge port 720 for discharging the air introduced into the air channel toward the cutting tip 530, as illustrated in a lower drawing of FIG. 8.

In addition, the air channel 710 may be provided with a branch port 711 supplying some of the air introduced into the air channel to the micro advance and retreat member 600.

The straight movement inducing block 510 may include a pair of fixed blocks 511 fixed to the internal housing 200, the straight movement block 512 provided between the pair of fixed blocks, having an upper surface on which the tool holder block 520 is seated, and advanced and retreated toward the cut surface 1a of the workpiece 1 by the micro advance and retreat member 600, and elastic blocks 513 elastically connecting the fixed blocks on both sides thereof and the straight movement block to each other so that straight movement of the straight movement block is induced.

In the present exemplary embodiment, a case in which the fixed blocks 511 have lower surfaces installed to closely adhere to a bottom surface of the cutting tool unit installation portion 240 of the internal housing 200 in order to secure a stable supporting force and have fastening holes 511a provided in a width direction to be thus assembled to the internal housing 200 by screws has been exemplified.

In the present exemplary embodiment, the straight movement block 512 may be provided with a reception portion 512a in which an upper portion of the micro advance and retreat member 600 is received, as illustrated in FIG. 12.

Here, the micro advance and retreat member 600 (see FIG. 12) may be a piezo-actuator capable of micro-advance and retreat.

In the present exemplary embodiment, the elastic blocks 513 connect both sides of the straight movement block 512 to upper and lower portions of inner surfaces of the pair of fixed blocks 511 to serve to control the straight movement block to accurately straight move. The elastic block 513 itself may be formed of an elastic material, but in the present exemplary embodiment, a structure in which the elastic block 513 has a plate-shaped structure and notch portions 513a thinner than other portions to be deformed by an external force are formed in a plate shape has been exemplified. The notch portions 513a may be provided at, for example, end portions of the elastic block 513 connecting the fixed block 511 and the straight movement block 512 to each other, and since these notch portions have a relatively small thickness, in a case in which an external force is applied to the notch portions, a load is concentrated on the notch portions, such that the notch portions induce accurate straight movement of the straight movement block 512 while being deformed.

Particularly, the straight movement block 512 is supported at four points to the fixed blocks 511 by the elastic blocks 513, such that the straight movement block is capable of the accurate straight movement without being deflected, at the time of advance and retreat movement of the straight movement block. Therefore, when processing a fine groove (oil dimple) in the cut surface 1a, cutting precision may be improved.

In addition, a case in which the cutting tip 530 has a circular shape is disclosed in the present exemplary embodiment. In a case of an existing cutting tip having a non-circular shape (for example, a triangular shape, a quadrangular shape, a rhombic shape, or the like), it is difficult to normally cut a groove and a groove is cut in a poor form even though a position is slightly misaligned. However, in the present invention, the cutting tip 530 has the circular shape, such that even though a position is misaligned or a direction is misaligned, a hemispherical groove (oil dimple) may be cut in a normal form, and reliability of processing of the groove (oil dimple) may thus be improved.

Meanwhile, the cutting tip 530 may be supported to the tool holder block 520 so as to rotate on its axis in a circumferential direction by a cutting moment at the time of cutting the workpiece 1. The reason is that the cutting tip 530 rotates on its axis at the time of a cutting work, such that an annular cutting blade may be uniformly used to prevent wear from being concentrated on a specific portion. In addition, a configuration in which the cutting tip may rotate on its axis may solve a trouble that a worker periodically changes an installation direction of the cutting tip 530.

Figure 9:
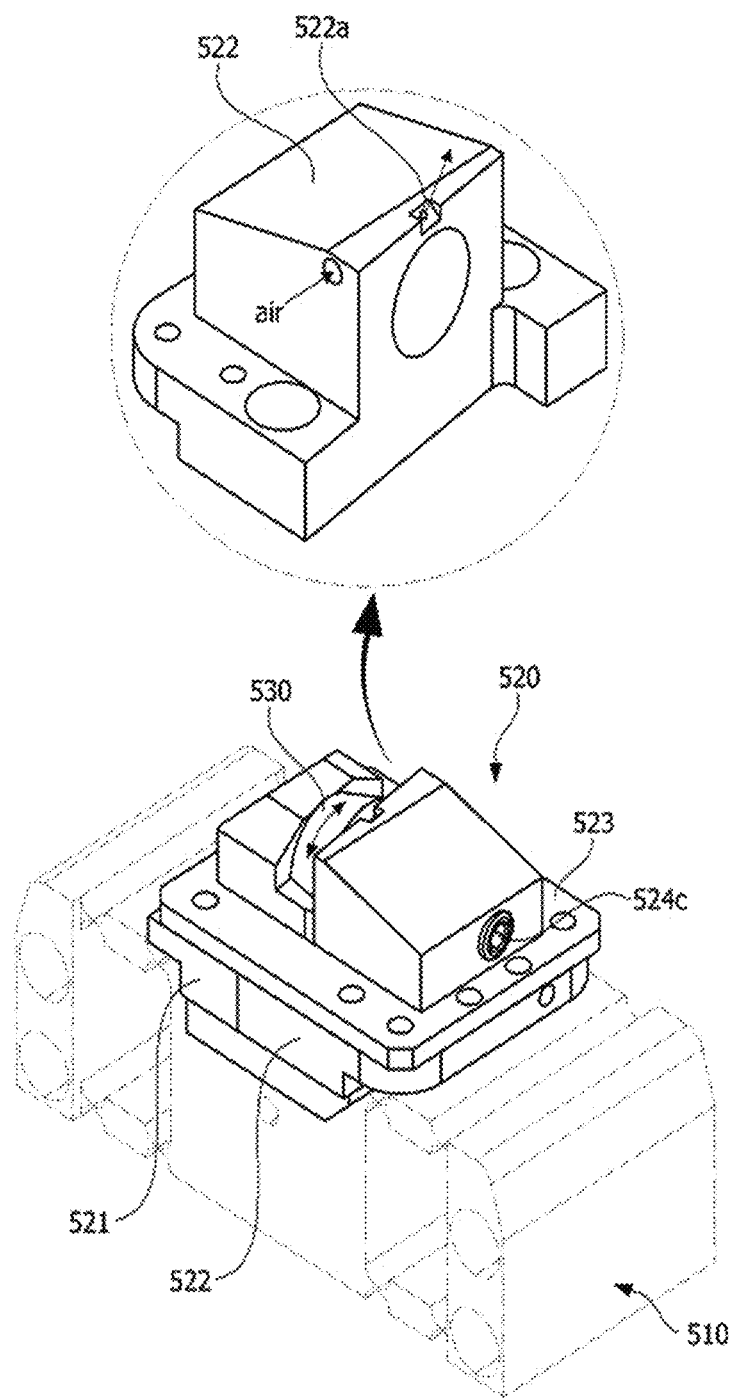
FIG. 9 is a perspective view illustrating another example of a cutting tool unit according to a first exemplary embodiment of the present invention.
Figure 10:
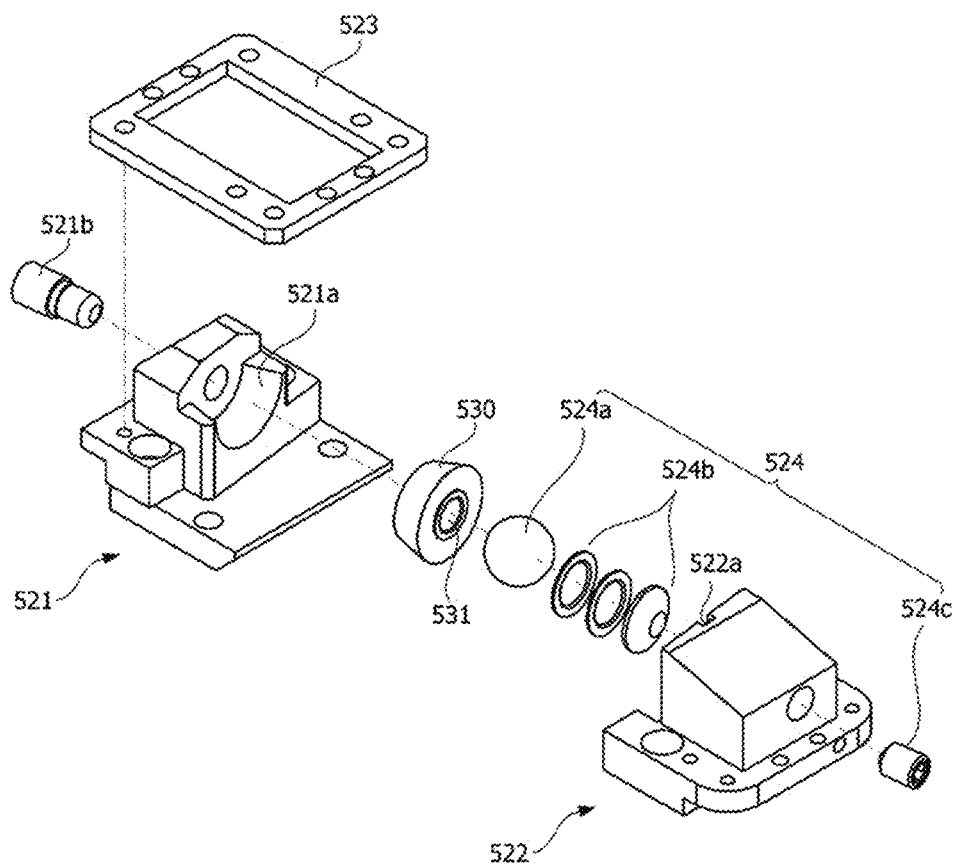
FIG. 10 is an exploded perspective view of the cutting tool unit illustrated in FIG. 9.
Figure 11:
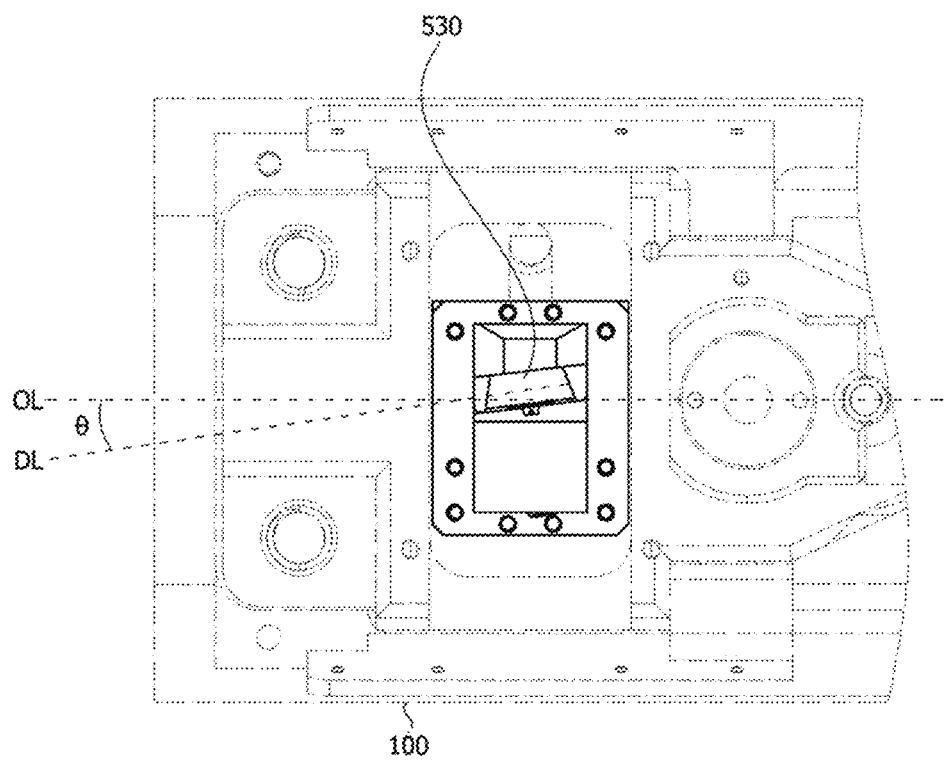
FIG. 11 is a plan view illustrating an installation state of the cutting tool unit illustrated in FIG. 9.

The tool holder block 520 enabling the cutting tip 530 to rotate on its axis may include a first holder block 521 provided with a seating groove 521a on which the cutting tip 530 is seated and provided with a tip shaft 521b disposed at one side of the seating groove and loosely coupled to a shaft hole 531 of the cutting tip 530, a second holder block 522 supporting a part of the cutting tip, and a pressing member 524 elastically pressing the cutting tip 530 toward the first holder block 521 with being installed in the second holder block, as illustrated in FIGS. 9 to 11. Reference numeral 523 denotes a finishing plate.

The pressing member 524 may include a ball body 524a in contact with the shaft hole 531 of the cutting tip 530, an elastic body 524b in contact with the other side of the ball body opposite to one side of the ball body in contact with the shaft hole, and a pressing bolt 524c screwed to the second holder block 522 to push the elastic body toward the cutting tip 530, thereby allowing the cutting tip to closely adhere to the first holder block 521 by the ball body 524a and the elastic body 524b. Here, the elastic body 524b may be formed of at least one Belleville spring.

According to such a configuration, the cutting tip 530 is loosely coupled to the tip shaft 521b to become a state in which it may rotate on its axis. In addition, smoothness of the rotation of the cutting tip 530 on its axis can be adjusted depending on a tightening degree of the pressure bolt 524c.

Here, in order to increase the smoothness of the rotation of the cutting tip 530 on its axis, as illustrated in FIG. 11, when viewing the cutting tip 530 on a plane, a diameter line DL of the cutting tip 530 may be disposed obliquely so as to form an acute angle (θ<90°) with respect to a central line OL of the external housing 100 in a length direction.

In an upper drawing of FIG. 9, reference numeral 522a denotes a cooling hole for discharging cooling air toward the cutting tip 530.

The micro advance and retreat member 600 serves to provide power so that the groove (oil dimple) is formed in the cut surface 1a by finely advancing the straight movement block 512 and the cutting tip 530 seated on the straight movement block 512 toward the cut surface 1a from a state in which the internal housing 200 is primarily advanced. In the present exemplary embodiment, the piezo-actuator is exemplified as the micro advance and retreat member.

The exemplified piezo-actuator may include a piezo 610 having one end grounded to the straight movement block 512 and the other end grounded to the internal housing 200 and advancing the straight movement block 512 while being expanded in a length direction when power is applied thereto, a connection shaft 620 connecting the straight movement block 512 and the internal housing 200 to each other with being disposed in the piezo and advanced in conjunction with the expansion of the piezo, and a retreating member 630 retreating the straight movement block 512 by pulling the connection shaft when the piezo is powered off, as illustrated in FIG. 12.

In the present exemplary embodiment, the retreating member 630 may include a bushing 631 fitted onto an outer peripheral surface of the connection shaft 620, a Belleville spring 632 exerting an elastic force in a direction in which the connection shaft 620 is pulled through the bushing with being installed between the bushing and the internal housing 200, and a lock nut 633 screwed to a distal end of the connection shaft 620 adjacent to the internal housing to specify an installation position of the bushing 631 and prevent the bushing from being separated, as illustrated in FIG. 12.

According to such a configuration, when the power is applied to the piezo 610, the piezo 610 advances the straight movement block 512 while being expanded, and the cutting tip 530 seated on the straight movement block 512 forms the groove (oil dimple) in the cut surface 1a while being also advanced.

Then, when the power applied to the piezo 610 is blocked, the connection shaft 620 is pulled toward the internal housing 200 by an expansion force of the Belleville spring 632, such that the piezo 610 in an expanded state is forcibly compressed while the straight movement block 512 connected to the connection shaft 620 is pulled.

The grooves (oil dimples) are processed while such a process is repeated.

Figure 14:
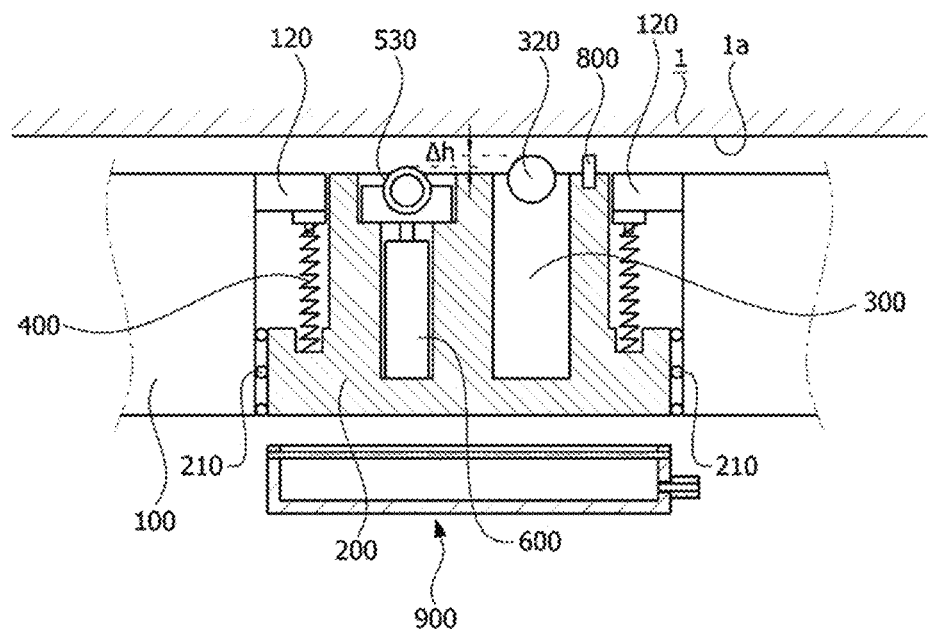
FIG. 14 is a schematic diagram illustrating an operation process of the cutting head (internal housing) according to a first exemplary embodiment of the present invention and is a state diagram before an operation.

Meanwhile, the cutting head 10 according to the present invention may further include a height difference sensing sensor 800 provided in the internal housing 200, sensing a change amount (Δh) in a height difference between the cutting tip 530 and the contact ball 320 in real time, and transmitting the sensed change amount (Δh) in a height difference to a control unit (to be described below), as illustrated in FIG. 14.

In a case in which the contact ball 320 or the retainer 330 is worn, the contact ball 320 enters the inside of the ball housing 310, such that the height difference between the cutting tip 530 and the contact ball 320 gradually decreases. This causes a cutting depth to be deeper than an original set deep.

As a method of preventing such a problem, when the height difference sensed by the height difference sensing sensor 800 is transmitted to the control unit in real time, the control unit determines whether or not the height difference is within a normal range or is the normal range or less, and in a case in which the height difference is the normal range or less, the control unit may automatically control an advancing movement displacement amount of the micro advance and retreat member 600 to be reduced as compared with an original set value to automatically control the cutting depth by the cutting tip 530 to be always constantly maintained.

Alternatively, when the height difference sensed by the height difference sensing sensor 800 is transmitted to the control unit in real time, the control unit may determine that the height difference is within a normal range or is the normal range or less, and in a case in which the height difference is the normal range or less, the control unit may notify a worker that the height difference is the normal range or less through any one of a display, a warning speaker, and a warning light to allow the worker to manually correct a position of the contact ball 320. The manual correction may be performed by rotating the lifting bolt 340 illustrated in FIG. 6 to adjust a height of the retainer 330.

Meanwhile, the cutting head 10 according to the present invention may further include a centrifugal force supplement member 900 accessorily pushing the internal housing 200 toward the workpiece 1 in order to supplement a weak centrifugal force acting on the internal housing 200, as illustrated in FIGS. 13 and 15.

For example, in a case in which a rotation speed of the cutting head 10 is slow, a centrifugal force is smaller than in a case in which the rotation speed of the cutting head 10 is fast, and response ability to a cutting force may thus be weakened. Therefore, the internal housing 200 may be accessorily pushed by the centrifugal force supplement member 900 serving as a pusher to supplement the response ability to the cutting force.

The centrifugal force supplement member 900 may be a pneumatic actuator in which a volume by an air pressure $f_1$ is expanded or contracted. Such a pneumatic actuator may include an air chamber 910 disposed at a lower portion of the internal housing 200 and filled with air through a second air connection channel 932 or 911 (see FIG. 4) provided at one side and a diaphragm 920 sealing an opened upper part of the air chamber and pushing the internal housing 200 while being expanded by the air pressure in the air chamber.

Reference numeral 930 denotes a fixing frame for fixing the diaphragm 920 to the air chamber 910.

In the cutting head 10 as described above, before the cutting head is rotated, the centrifugal force does not act, such that the internal housing 200 is in a state in which it is spaced apart from the elastic member 400 by an expansion force $f_2$ of the elastic member 400, as illustrated in FIG. 14, When the cutting head 10 rotates in order to process the groove (oil dimple) from such a state, the contact ball 320 of the contact member 300 that most protrudes is first in contact with the cut surface 1a while the internal housing 200 advances toward the cut surface 1a of the workpiece 1, as illustrated in FIG. 15, by a centrifugal force (F=mrω²) (here, F is a centrifugal force, m is a mass of the internal housing, r is a radius of rotation of the internal housing, and w is an angular velocity of the internal housing), such that the internal housing 200 becomes a state in which it is stably supported.

Then, the cutting tip 530 cuts the grooves at regular interval while becoming close to or distant from the cut surface 1a by micro advance and retreat movement of the micro advance and retreat member 600. In this case, accurate straight movement is induced by the straight movement block 512 as advance and retreat movement of the cutting tip 530, and an accurate cutting work is thus possible.

Next, when a groove work is completed in an inner surface of a corresponding cylinder bore, the rotation of the cutting head 10 is stopped, and the centrifugal force thus disappears. Therefore, as illustrated in FIG. 16, the internal housing 200 is retreated and returned to an original position by the expansion force $f_2$ of the elastic member 400.

In this case, since the internal housing is spaced apart from the cut surface 1a of the workpiece 1, the internal housing may be removed from a corresponding cylinder without interference, and may be inserted into another adjacent cylinder bore on which a work is to be performed, without interference, such that an automation process becomes possible.

Figure 18:
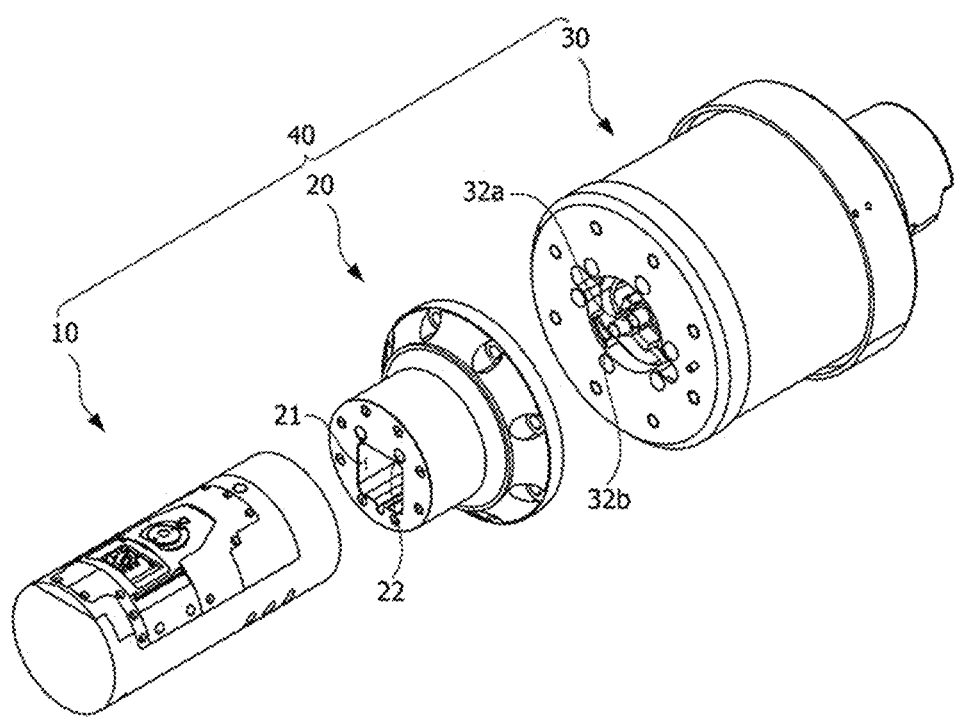
FIG. 18 is an exploded perspective view of a cutting apparatus according to a first exemplary embodiment of the present invention.

Hereinafter, a cutting apparatus according to an exemplary embodiment of the present invention including the cutting head 10 described above will be described with reference to FIGS. 18 to 20.

A cutting apparatus 40 including the cutting head 10 described above may further include a buffer unit 20 coupled to a distal end of the cutting head 10 and a main body unit 30 coupled to a distal end of the buffer unit.

Here, the buffer unit 20 may include a buffer chamber 21 for keeping an air pressure of the air introduced into the cutting head 10 constant.

The main body unit 30 may include a control unit 31 (see FIG. 20) analyzing the height difference between the cutting tip 530 and the contact ball 320 sensed in real time by the height difference sensing sensor 800 to determine whether the analyzed height difference is within the normal range or is out of the normal range.

Figure 19:
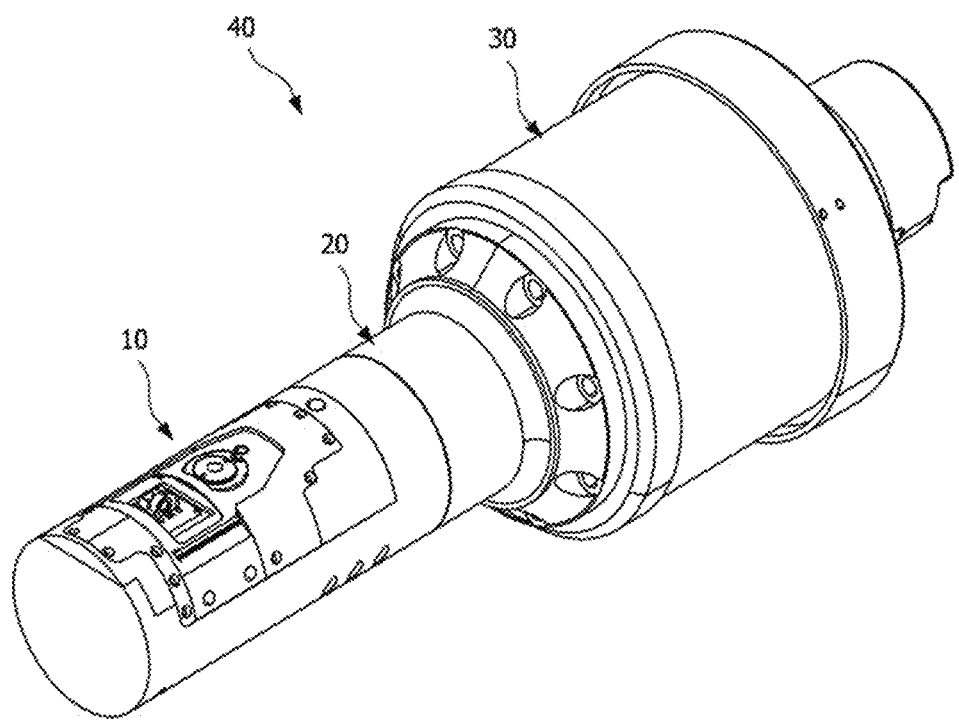
FIG. 19 is an assembled perspective view of the cutting apparatus according to a first exemplary embodiment of the present invention.
Figure 20:
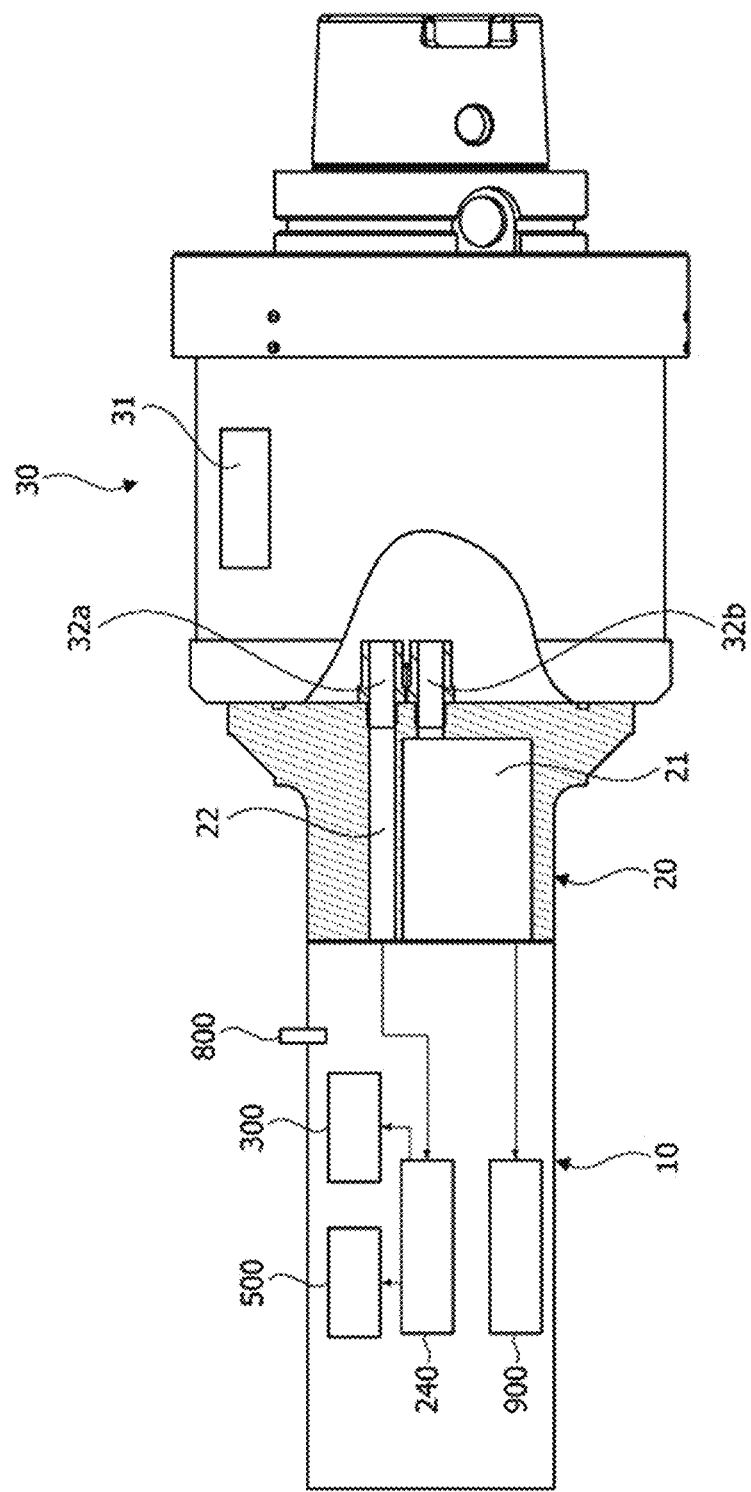
FIG. 20 is a schematic view schematically illustrating an air introduction path of the cutting head according to a first exemplary embodiment of the present invention.

In addition, the main body unit 30 may further include first and second air supply ports 32a and 32b, as illustrated in FIGS. 19 and 20. The first air supply port 32a is for supplying air to the cutting tip 530 and the contact ball 320 of the cutting head 10, and the second air supply port 32b is for supplying air the air chamber 910 of the centrifugal force supplement member 900.

Figure 17:
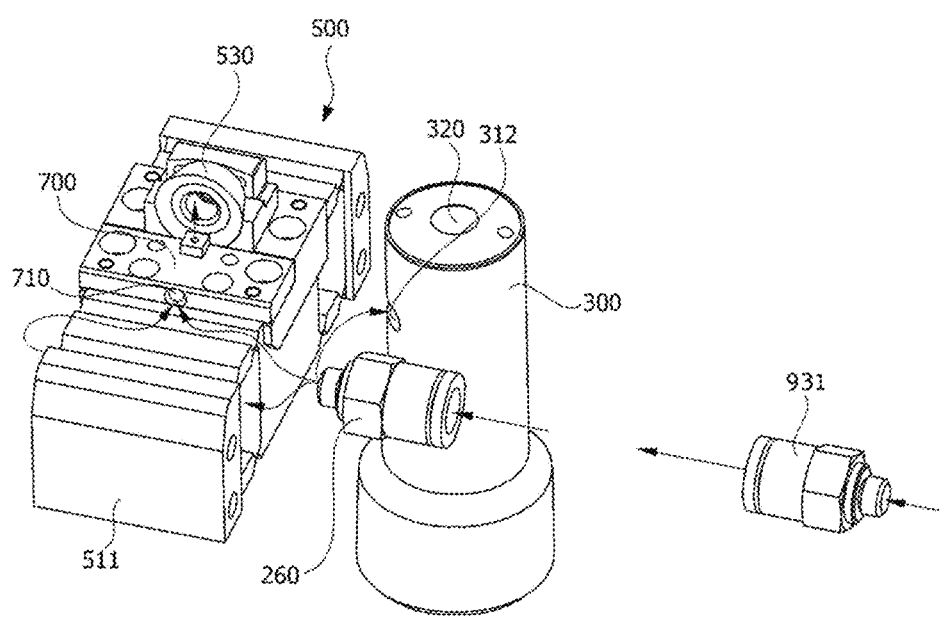
FIG. 17 is a view for describing an air introduction path to a cutting tool and a contact member according to a first exemplary embodiment of the present invention.

The air supplied from the first air supply port 32a is injected into the cutting tool unit installation portion 240 through a first air supply channel 22 provided in the buffer unit 20 and a first air connection channel 931 or 260 (see FIG. 3) of the external housing 100, as illustrated in FIG. 20, and the air injected into the cutting tool unit installation portion is introduced into the air channel 710 of the cooling block 700 through a gap between an outer surface of the cutting tool unit 500 and an inner wall of a space portion and is finally discharged to the cutting tip 530 through the air discharge port 720, as illustrated in FIGS. 8 and 17. Therefore, the air serves to cool cutting heat of the cutting tip 530 and remove a cutting chip generated at the time of cutting.

In addition, the air is introduced into a lower portion of the contact ball 320 through a communication hole 251 (see FIG. 5) penetrating between the contact member installation portion 250 and the cutting tool unit installation portion 240 so that contact member installation portion 250 and the cutting tool unit installation portion 240 communicate with each other and the cooling hole 312 provided in the ball housing 310 of the contact member 300. The introduced air serves to cool frictional heat generated in a process in which the contact ball 320 is in contact with the cut surface 1a of the workpiece 1 and the retainer 330 and delay the wear of the contact ball by serving as an air lubricant of the contact ball 320.

The air supplied from the second air supply port 32b is introduced into the air chamber 910 through the buffer chamber 21 of the buffer unit 20 and a second air connection channel 932 or 911 (see FIG. 4) of the external housing 100, as illustrated in FIG. 20, to increase the air pressure $f_1$ in the air chamber 910, such that the diaphragm 920 having flexibility supports the internal housing 200 while being expanded, thereby generating response ability to the cutting force.

Meanwhile, referring to FIGS. 14 to 16, the cutting head 10 according to the first exemplary embodiment described above is installed at a position deviating from the center of the internal housing 200, and an eccentric load may thus act on the internal housing 200 at the time of a cutting work. Hereinafter, a cutting head according to another exemplary embodiment of the present invention capable of solving such a problem will be described.

Figure 21:
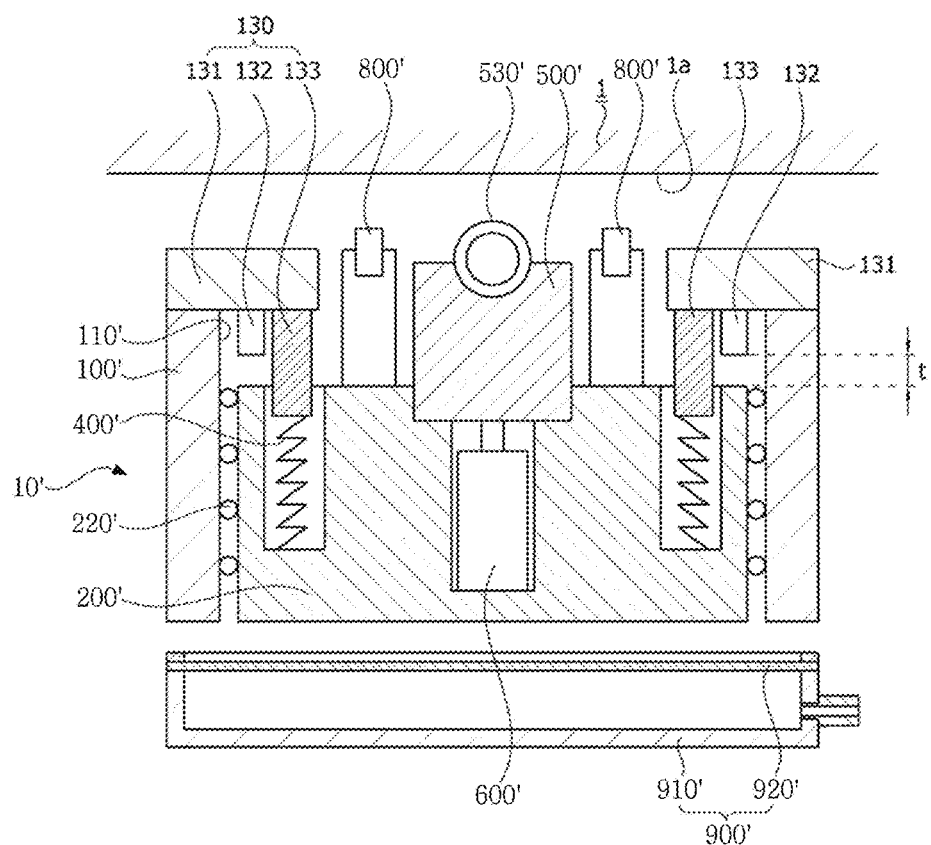
FIG. 21 is a conceptual diagram of the cutting head according to a second exemplary embodiment of the present invention and is a state diagram before an operation of the cutting head.
Figure 22:
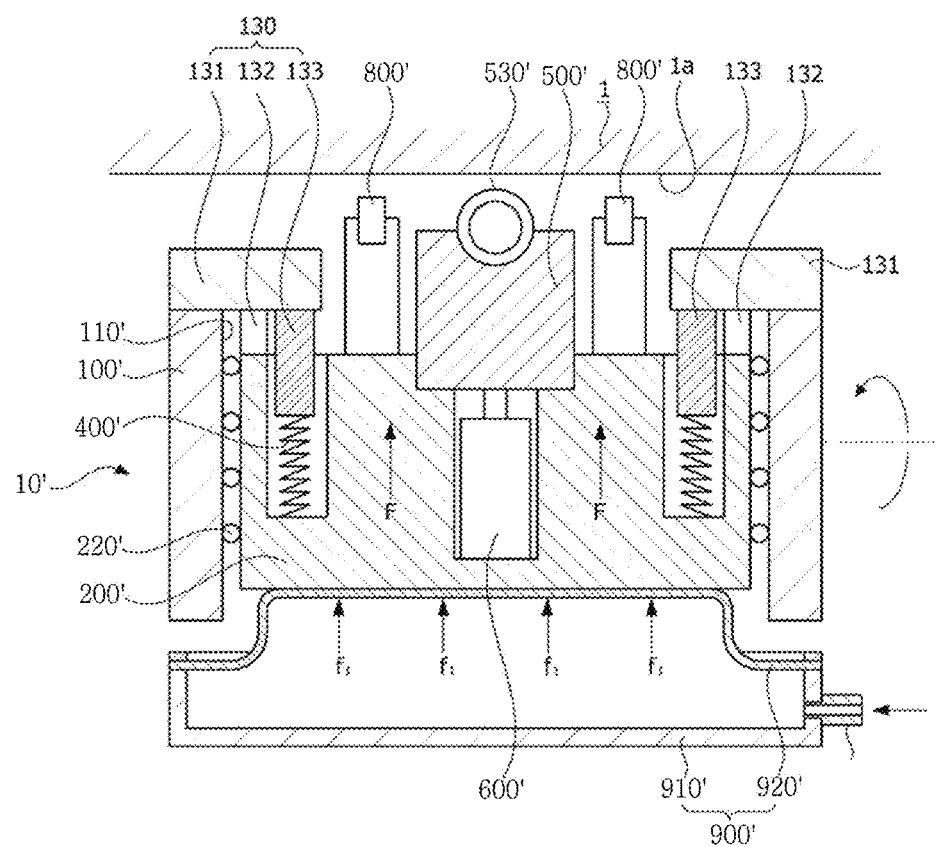
FIG. 22 is a conceptual diagram of the cutting head according to a second exemplary embodiment of the present invention and is a state diagram during an operation of the cutting head.
Figure 23:
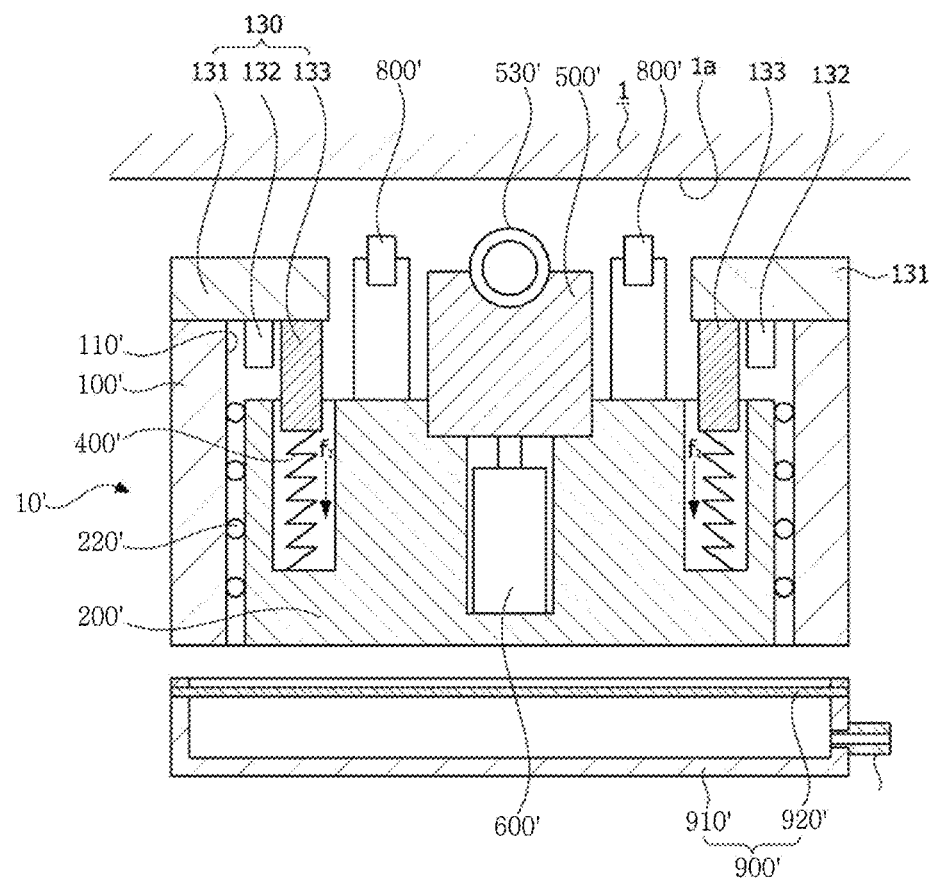
FIG. 23 is a conceptual diagram of the cutting head according to a second exemplary embodiment of the present invention and is a state diagram after an operation of the cutting head.

FIGS. 21 to 23 are conceptual diagrams of a cutting head according to a second exemplary embodiment of the present invention. Particularly, FIG. 21 is a state diagram before an operation of the cutting head, FIG. 22 is a state diagram during an operation of the cutting head, and FIG. 23 is a state diagram after an operation of the cutting head.

Referring to FIGS. 21 to 23, a cutting head 10' according to the present exemplary embodiment may include an external housing 100', an internal housing 200', a stopping block 130, and guide rollers 220'.

The external housing 100' is connected to a spindle (not illustrated) to rotate together with the spindle, and an internal housing installation portion 110' in which the internal housing 200' is embedded may be provided in the external housing 100', as illustrated in FIGS. 21 to 23.

The internal housing 200' may be installed to be slidable in a depth direction of the internal housing installation portion 110' of the external housing 100', as illustrated in FIG. 21.

The internal housing 200' is advanced toward a cut surface 1a of a workpiece 1 while compressing an elastic member 400' by a centrifugal force generated as the external housing 100' rotates, as illustrated in FIG. 22, and is returned (retreated) to an original position by an expansion force $f_2$ of the elastic member 400' when the external housing is stopped, such that the centrifugal force disappears, as illustrated in FIG. 23

For reference, the elastic member 400' may be inserted into a spring insertion groove 122 formed in the internal housing 200' and having an upper opening form, and separation of the elastic member 400' from the spring insertion groove may be prevented by constraint rods 133.

Figure 24:
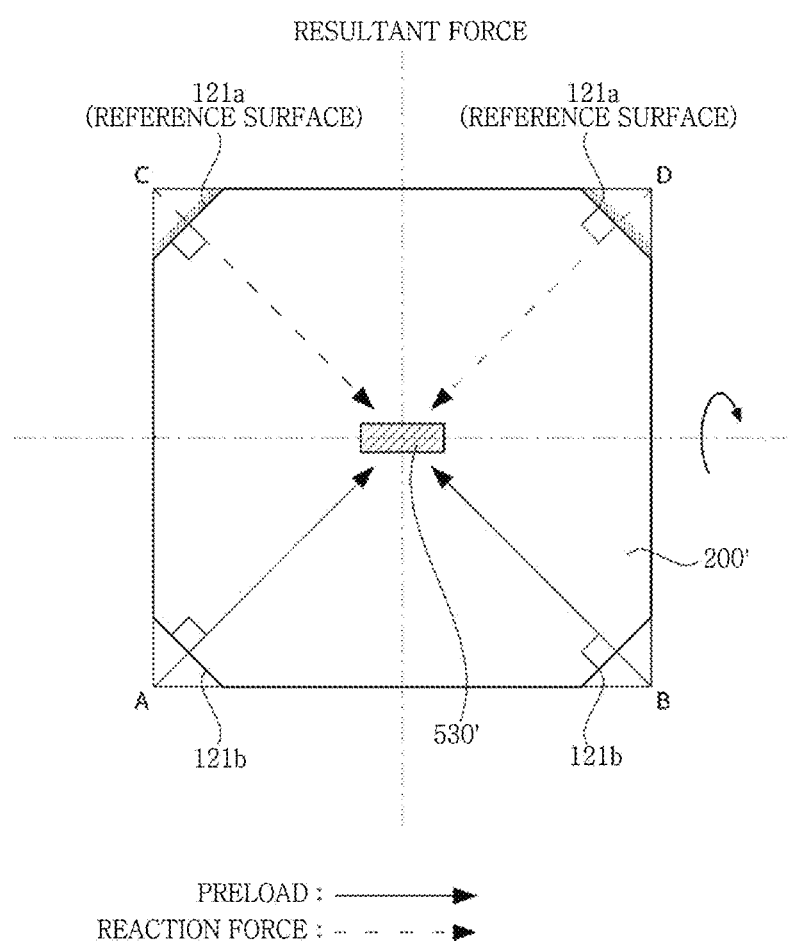
FIG. 24 is a state diagram of preloads and reaction forces acting on an internal housing of one form according to a second exemplary embodiment of the present invention.
Figure 25:
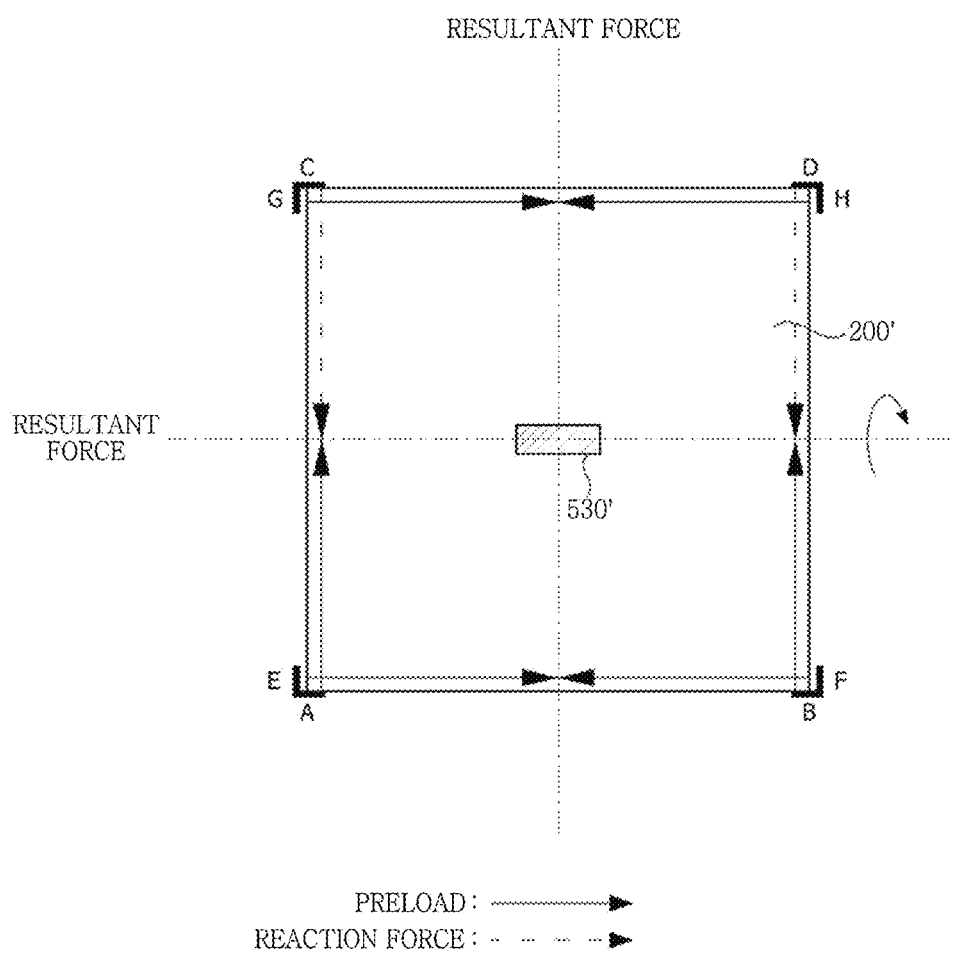
FIG. 25 is a state diagram of preloads and reaction forces acting on an internal housing of another form according to a second exemplary embodiment of the present invention.
Figure 26:
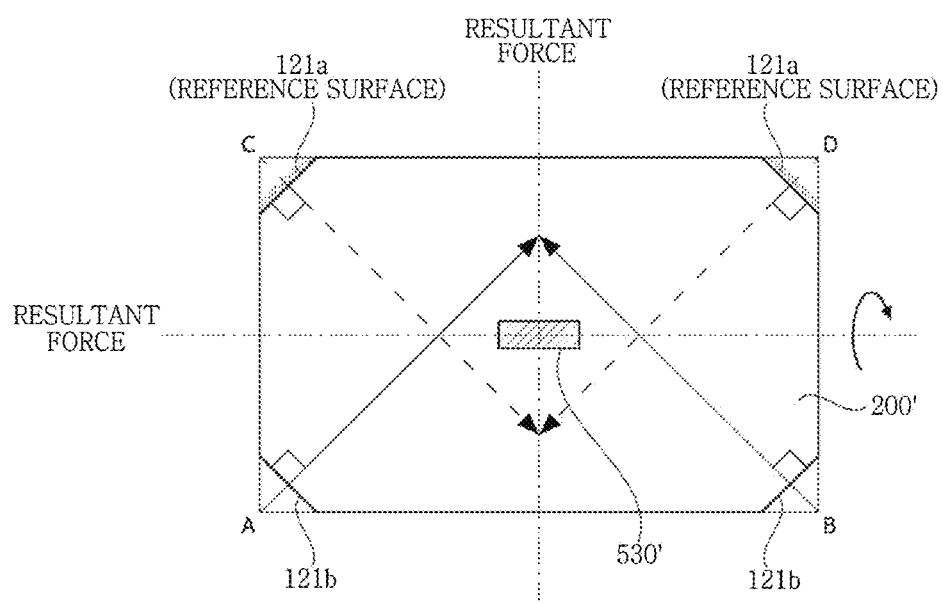
FIG. 26 is a state diagram of preloads and reaction forces acting on an internal housing of still another form according to a second exemplary embodiment of the present invention.

A cutting tip 530' may be installed at a central portion of the internal housing 200', as illustrated in FIGS. 24 to 26. The cutting tip 530' cuts a plurality of oil dimples at desired depths and intervals in the cut surface 1a while repeating fine and additional advance toward the cut surface 1a by a micro advance and retreat member 600' illustrated in FIGS. 21 to 23, when the internal housing 200 is advanced by the centrifugal force.

Here, since the cutting tip 530' is installed at the center of the internal housing 200', when the cutting tip 530' performs the cutting, a load acts only on the center of the internal housing 200', such that a moment is not generated in the internal housing 200'. Therefore, the cutting tip 530' may be stably advanced and retreated, and precise cutting becomes thus possible.

Figure 27:
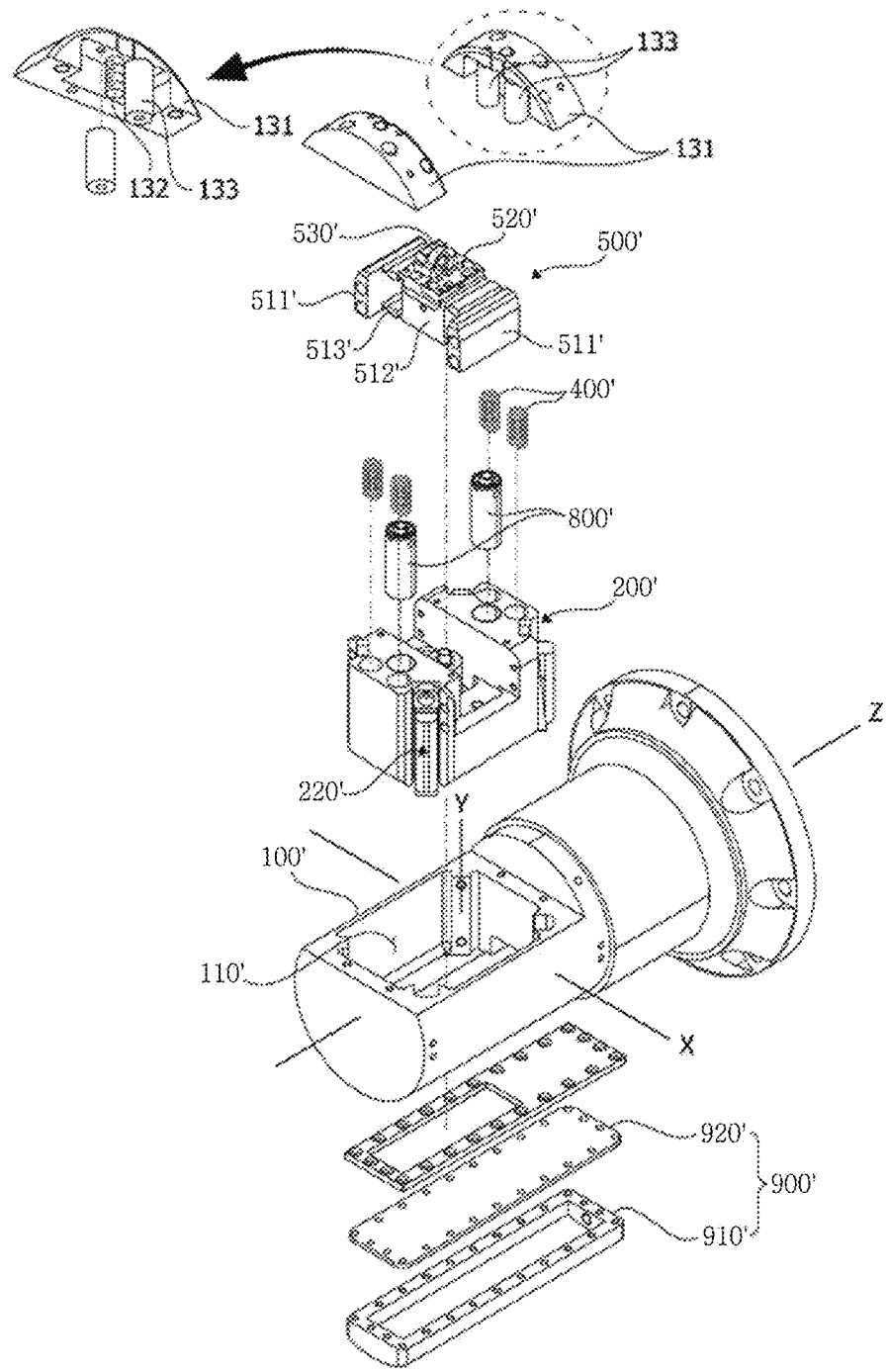
FIG. 27 is a detailed exploded perspective view of a cutting head according to a second exemplary embodiment of the present invention.

In addition, it is preferable the internal housing 200' has a hexahedral shape, as illustrated in a detailed drawing of FIG. 27, and a surface of the internal housing on which the cutting tip 530' is disposed and a back surface thereof have a square shape. In addition, support surfaces 121a and 122b of the internal housing 200' by the guide rollers 220' may have chamfered forms as illustrated in FIGS. 24 and 26. Particularly, as illustrated in FIG. 24, it is also preferable that support surfaces 121a and 121b in directions diagonally intersecting with each other correspond to each other with respect to the cutting tip 530'.

The reason will be described with reference to FIG. 24. That is, in FIG. 24, in a case of applying preloads to an inclined A support surface 121b and B support surface 121b in order to closely adhere the internal housing 200' to a wall surface of the internal housing installation portion 110' of the external housing 100', reaction forces against the preloads are generated in cross directions on a C support surface 121a corresponding to the B support surface and a D support surface 121a corresponding to the A support surface. In this case, the cutting tip 530' is positioned on a resultant force line of the preloads and the reaction forces, which is the center of the internal housing 200', to become a fixed point that is not biased toward any one side, that is, a nodal point. Therefore, when the cutting tip 530' performs the cutting while advancing and retreating by the micro advance and retreat member 600', the cutting tip 530' is in a positionally stable state.

As another exemplary embodiment, as illustrated in FIG. 25, in a case in which a support surface 121 has eight corners A, B, C, D, E, F, G, and H, reaction forces against preloads are generated in side directions of the internal housing 200' on C and G support surfaces and D and H support surfaces. In this case, the cutting tip 530' is positioned at the center of a line connecting resultant force points of the preloads and the reaction forces to each other, such that the cutting tip 530' may also be in a positionally stable state.

As yet another exemplary embodiment, as illustrated in FIG. 26, in a case in which the internal housing 200' has a rectangular shape, when preloads are applied to an inclined A support surface 121a and B support surface 121b, a resultant force point of preload lines of the A support surface 121b and the B support surface 121b is generated at an upper side of the internal housing 200' on the drawing, and a resultant force point of preload lines of a C support surface 121a and a D support surface 121a is generated at a lower side of the internal housing 200' on the drawing. In this case, the cutting tip 530' is positioned at the center of a line connecting a resultant force point of the preloads and a resultant force point of the reaction forces to each other, such that the cutting tip 530' may also be in a positionally stable state.

Figure 29:
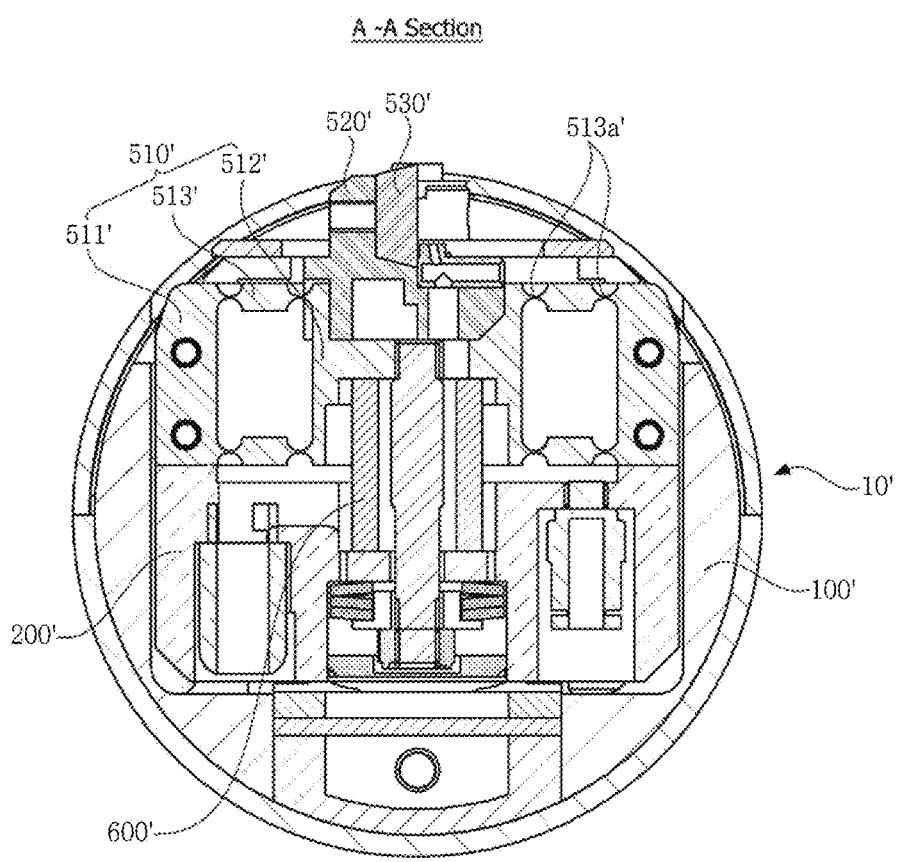
FIG. 29 is a cross-sectional view taken along line A-A of FIG. 28.

Meanwhile, a straight movement property of the cutting tip 530' may be induced by a cutting tool unit 500' installed in the internal housing 200'. The cutting tool unit 500' is fixedly installed in the internal housing 200', as illustrated in FIGS. 27 and 29, and the cutting tip 530' is installed at an upper side of the cutting tool unit 500', such that the cutting tool unit 500' serves to control straight movement of the cutting tip when being advanced and retreated by the micro advance and retreat member 600'. The cutting tool unit 500' has the same structure as that of the cutting tool unit according to the first exemplary embodiment described above, and a detailed description thereof is thus omitted.

The cutting head 10' according to a second exemplary embodiment of the present invention does not include the contact member 300 in the cutting head 10 according to the first exemplary embodiment described above, but may include the stopping block 130 performing a function similar to that of the contact member 300. Returning FIGS. 21 to 23 (and also referring to FIG. 27), the stopping block 130 serves to limit a maximum advance distance of the internal housing 200' with being installed at an upper end of the external housing 100' on the drawings, and may include a pair of block bodies 131 coupled to both opened sides of the internal housing installation unit 110', respectively, stoppers 132 each provided on the block bodies and limiting a maximum advance distance of the internal housing 200', and the constraint rods 133 each provided on the block bodies and preventing separation of the elastic member 400'.

The stopper 132 is spaced apart from an upper end of the internal housing 200' on the drawing by a predetermined distance t before the internal housing 200' advances, as illustrated in FIG. 21.

When the centrifugal force acts, the internal housing 200' that is advanced is in contact with lower ends of the stoppers 132, as illustrated in FIG. 22, such that the advance of the internal housing is limited. In this case, since the cutting tip 530' is only in a state in which it becomes close to the cut surface 1a and is not in a state in which it is in contact with the cut surface 1a, damage to an edge of the cutting tip 530' and the micro advance and retreat member 600' may be prevented.

Then, the cutting tip 530' becoming close to the cut surface 1a processes the oil dimples in the cut surface 1a while being finely advanced and retreated by the micro advance and retreat member 600'.

Figure 28:
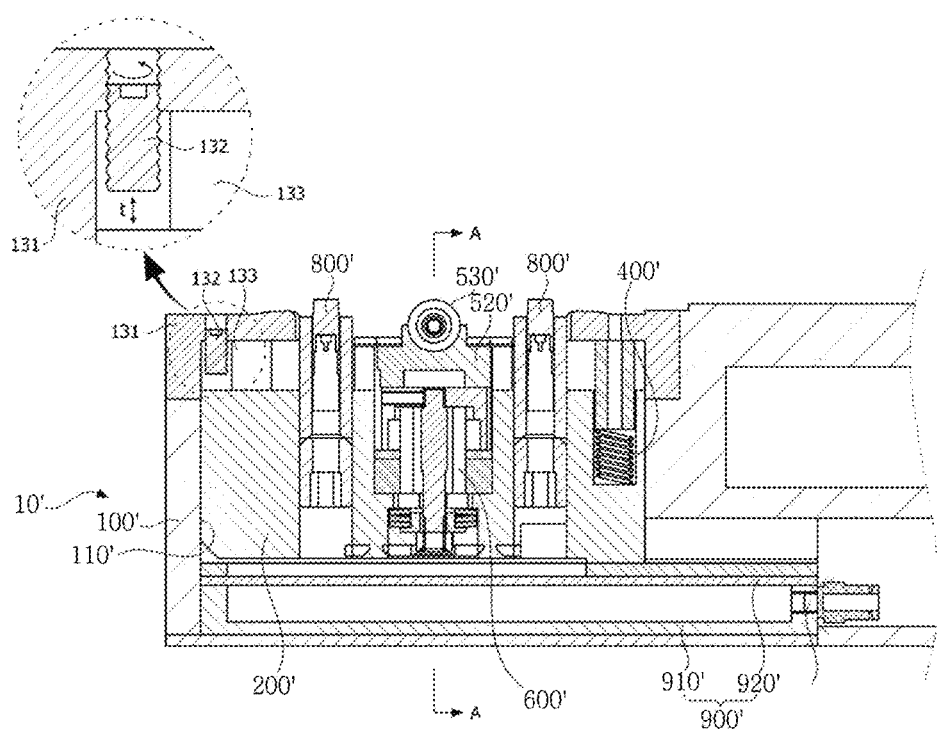
FIG. 28 is a longitudinal cross-sectional view of an assembled state of FIG. 27.

Meanwhile, a protrusion degree of the stopper 132 from the block body 131 may be controlled. In the present exemplary embodiment, the stopper 132 may be coupled to the block body 131 in a screw manner, as illustrated in FIG. 28. Therefore, when the stopper 132 is rotated by a tool, the protrusion degree of the stopper 132 is adjusted, and the maximum advance distance of the internal housing 200' may thus be calibrated.

In detail, when the cutting tip 530' is worn due to use for a long period of time, a cutting depth of the oil dimple may be reduced by an amount of the worn cutting tip. In this case, when an advance distance of the internal housing 200' is increased by the amount of worn the cutting tip 530', the cutting depth may be compensated for. Therefore, it is sufficient that the stopper 132 is adjusted to protrude by a protrusion degree less than an existing protrusion degree.

To the contrary, in a case in which a cutting depth of the oil dimple is larger than a set value, it is sufficient to reduce an advance distance of the internal housing 200'. Therefore, it is sufficient that the stopper 132 is adjusted to protrude by a protrusion degree more than an existing protrusion degree.

Figure 30:
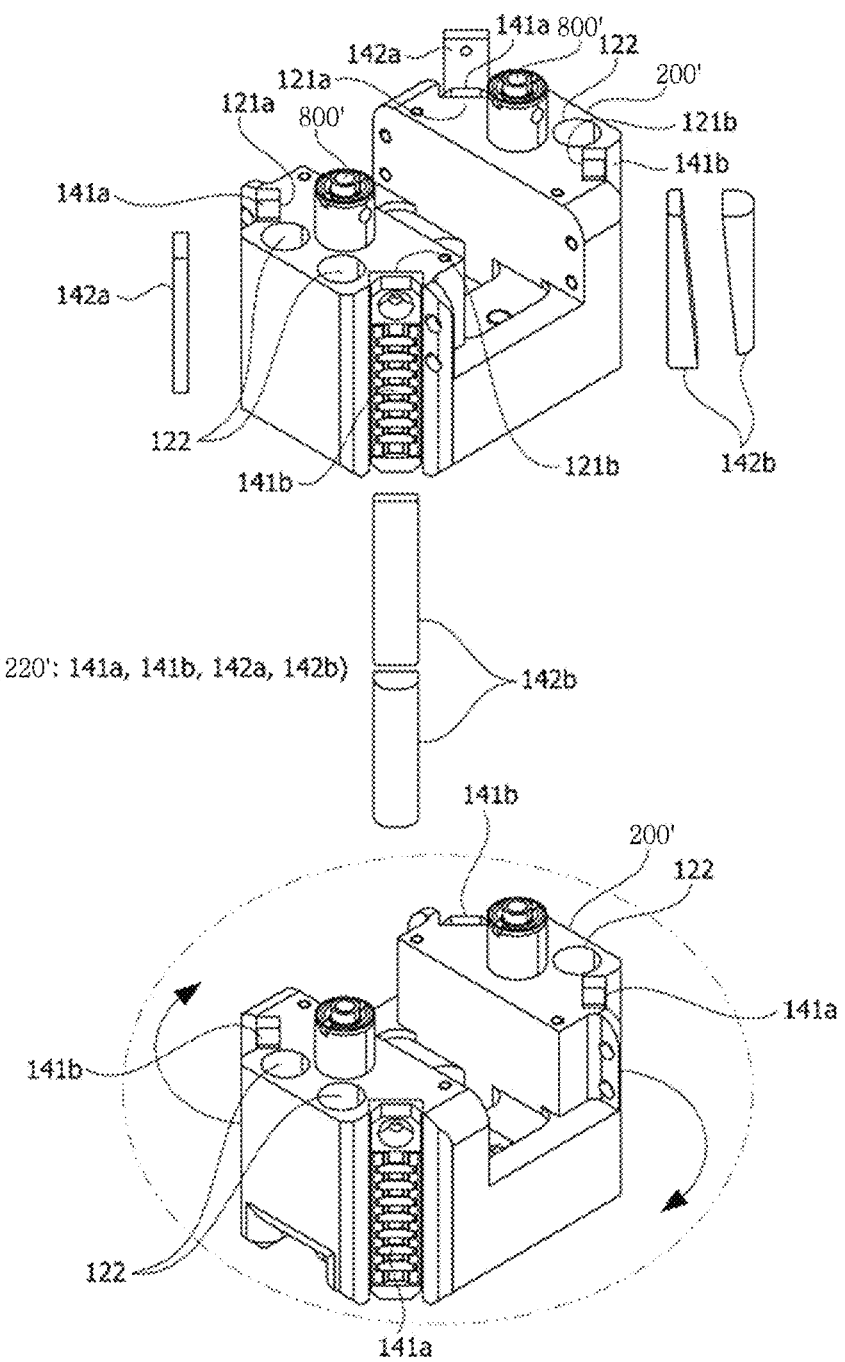
FIG. 30 is detailed views of an internal housing guide rollers according to a second exemplary embodiment of the present invention (a lower drawing is a state diagram in which the internal housing is inverted).

The guide rollers 220' serve to support the internal housing 200' so that the internal housing 200' is accurately straightly movable, and may include roller guide bearings 141a and 141b installed on the support surfaces 121a and 121*b* of the internal housing 200', respectively, and a plurality of rolling plate members 142*a* and 142*b* positioned corresponding to the roller guide bearings, respectively, to serve as rolling plates of the roller guide bearings, as illustrated in FIG. 30. Therefore, when the internal housing 200' is advanced and retreated, the internal housing 200' moves in a rolling motion by the roll guide bearings 141*a* and 141*b*, such that friction may be reduced.

Here, it is preferable that a pair of rolling plate members 142*b* disposed side by side in a lateral direction among the plurality of rolling plate members 142*a* and 142*b* have a form of wedges press-fitted between the corresponding support surface and the internal housing installation portion 110' of the external housing 100. The rolling plate members 142*b* having the form of the wedge allows the internal housing 200' to closely adhere to the internal housing installation portion 110', such that stable straight movement of the internal housing 200' without a gap is ensured by a preload amount when the internal housing 200' is advanced and retreated.

The cutting head 10' according to the present exemplary embodiment may further include a pair of sensing sensors 800' installed on a surface of the internal housing 200' facing the workpiece 1 and measure a distance to the cut surface 1*a* of the workpiece and sensing a gradient of the internal housing 200'.

In a case in which two sensing sensors 800' are installed at both sides of the cutting tip 530', respectively, when the cutting head 10' is inclined, distance values from the respective sensing sensors to the cut surface 1*a* may become different from each other. In this case, when two distance values are calculated, an angle at which a shaft is inclined may be calculated. Therefore, a gradient of the cutting head 10' may be calibrated in parallel with the cut surface 1*a* by adjusting a rotation shaft of a machine tool.

The cutting head 10' according to the present exemplary embodiment may further include a centrifugal force supplement member 900' accessorily pushing the internal housing 200' toward the workpiece 1 in order to supplement the centrifugal force acting on the internal housing 200' at the time of cutting, as illustrated in FIGS. 21 to 23 and 27. The centrifugal force supplement member 900' is the same as that of the first embodiment described above, and a detailed description thereof is thus omitted.

Meanwhile, in the cutting heads 10 and 10' according to the first and second exemplary embodiments described above, the straight movement blocks 512 and 512' are constrained only in one axis direction. Therefore, loads are concentrated on the notch portions of the elastic blocks 513 and 513' at the time of the cutting work, such that a lifespan of the cutting head may be reduced and cutting precision of the cutting head may be deteriorated. Hereinafter, a cutting head according to yet another exemplary embodiment of the present invention provided with a stable support structure so as to be capable of solving such a problem will be described.

Figure 31:
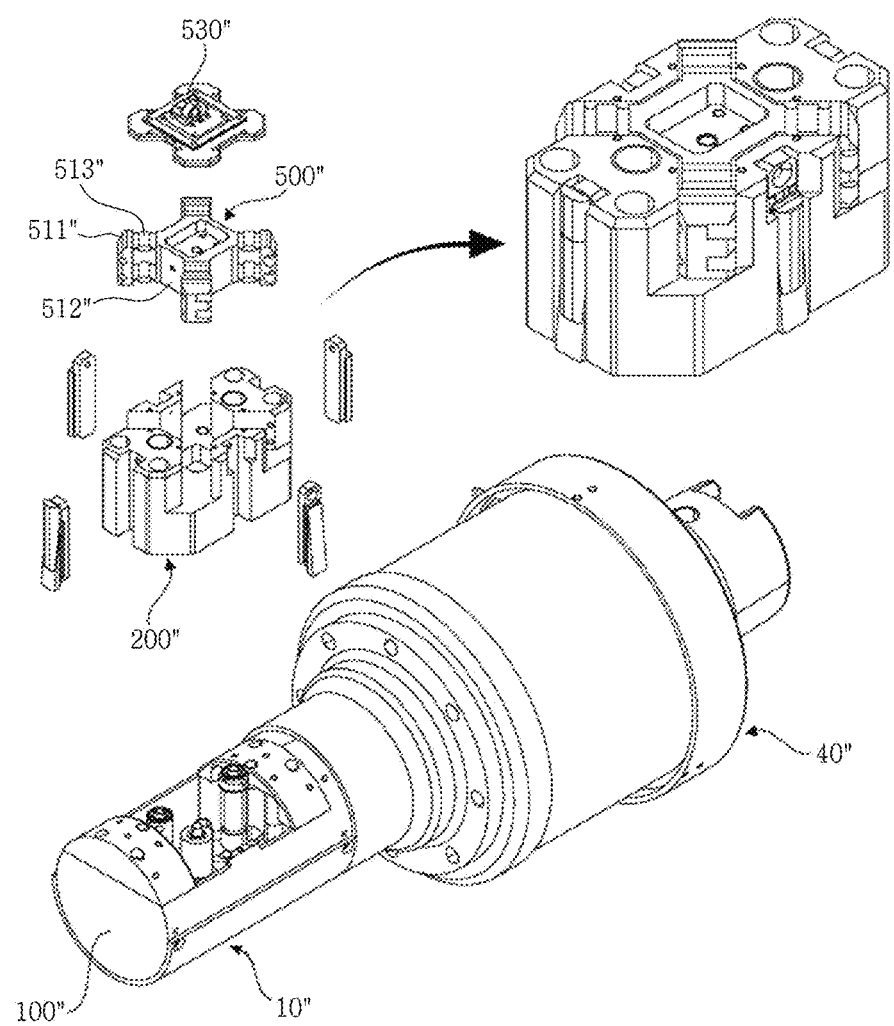
FIG. 31 is a partially exploded perspective view of a cutting head according to a third exemplary embodiment of the present invention.
Figure 32:
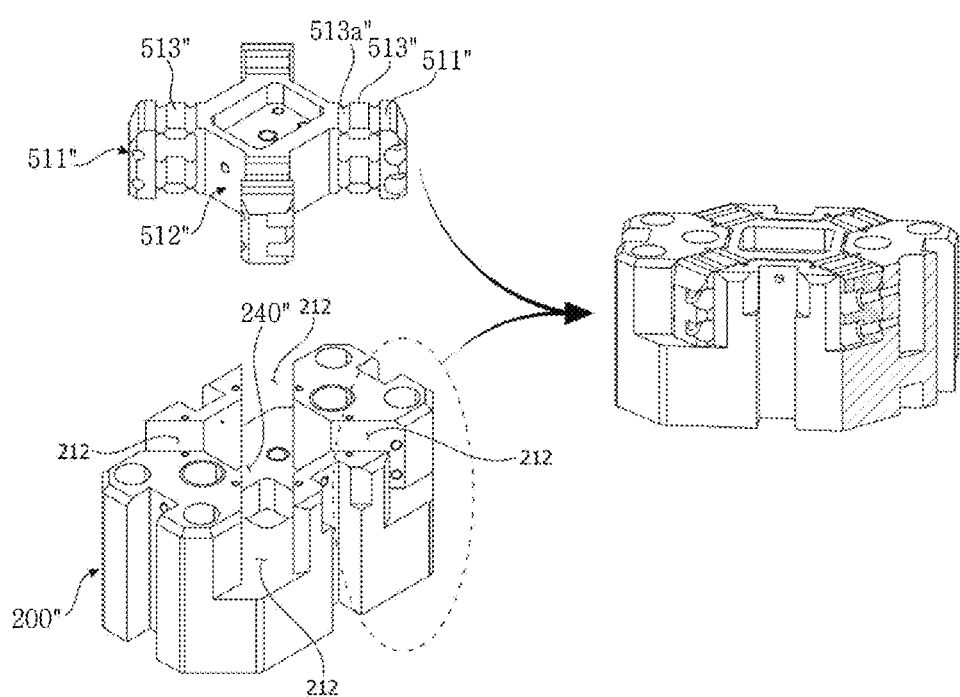
FIG. 32 is an enlarged view illustrating main portions of FIG. 31.

FIG. 31 is a partially exploded perspective view of a cutting head according to a third exemplary embodiment of the present invention, and FIG. 32 is an enlarged view illustrating main portions of FIG. 31.

Referring to FIGS. 31 and 32, a cutting head 10" according to a third exemplary embodiment of the present invention may include an internal housing 200", a cutting tool unit 500", and a cutting tip 530". Here, the cutting head 10" according to the present exemplary embodiment has a structure in which the internal housing 200" is primarily advanced by a centrifugal force and the cutting tool unit 500" is secondarily finely advanced by a piezo-actuator.

A cutting tool unit installation unit 240" on which the cutting tool unit 500" is seated may be provided at a center of the internal housing 200", and oblique grooves 212 into which fixed blocks 511" and elastic blocks 513" to be described are inserted may be provided in an oblique direction at corner portions of the cutting tool unit installation portion 240".

A straight movement block 512" is a component elastically supported within the internal housing 200" by the elastic blocks 513" and finely advanced by the piezo-actuator in a state in which the internal housing 200" is advanced.

Here, the straight movement block 512" may have a rectangular shape, and the fixed blocks 511" may be provided at corners of the straight movement block 512", respectively, and be disposed in an oblique (diagonal) direction so as to be symmetrical to each other with respect to the center of the straight movement block 512". The elastic blocks 513" elastically connect the fixed blocks 511" and the straight movement block 512" to each other.

The reason why the cutting tool unit 500" has such a disposition structure will be described with reference to FIG. 33.

Figure 33:
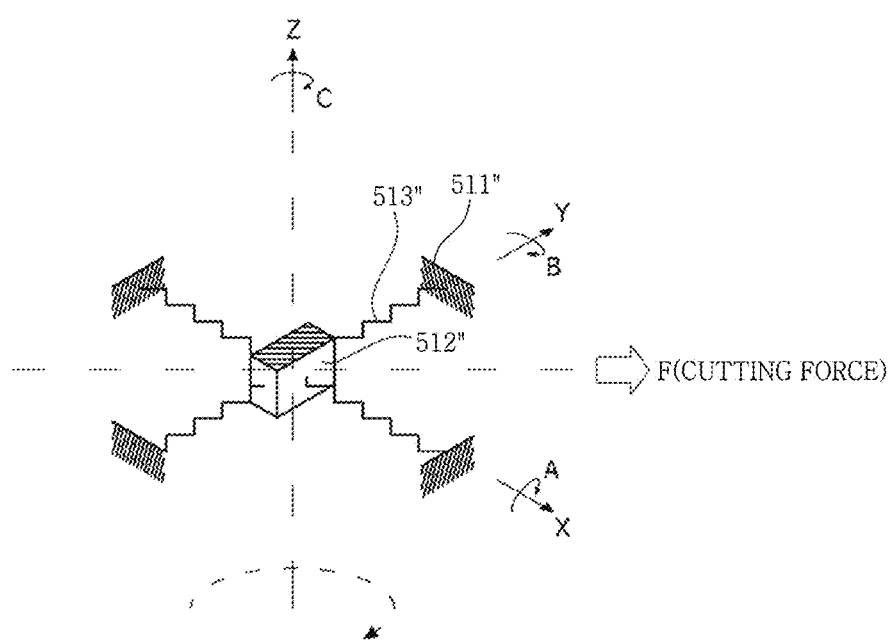
FIG. 33 is a schematic view illustrating a coupling relationship between a straight movement block and an elastic block of a cutting head according to a third exemplary embodiment of the present invention.

That is, as illustrated in FIG. 33, in a case in which the respective corners of the straight movement block 512" are supported by the elastic blocks 513", the straight movement block 512" is in a state in which a degree of freedom is limited in all of X, Y, A, B, and C directions excluding a Z direction (a direction toward a workpiece). Therefore, loads applied to the elastic blocks 513" at the time of cutting may be distributed, such that a firm support force may be secured and processing precision may be improved.

The cutting tip 530", which is fixed to the cutting tool unit 500" to cut the workpiece is the same as that of the exemplary embodiment described above, and a detailed description thereof is thus omitted.

Meanwhile, the cutting heads 10' and 10" according to the second and third exemplary embodiments described above may constitute the cutting apparatuses together with a buffer unit 20 and a main body unit 30, like the cutting head 10 according to the first exemplary embodiment described above (see FIGS. 18 to 20).

While this invention has been described in connection with what is presently considered to be practical exemplary embodiments, it is to be understood that the invention is not limited to the disclosed embodiments. On the contrary, it is intended to cover various modifications and equivalent arrangements included within the scope of the appended claims.

DESCRIPTION OF SYMBOLS

1: workpiece 1*a*: cut surface
10, 10', 10": cutting head 20: buffer unit
21: buffer chamber 30: main body unit
100, 100', 100": external housing
110, 110' 110": internal housing installation portion
200, 200' 200": internal housing
210: wedge 220, 220': guider oiler
240, 240": cutting tool unit installation portion 250: contact member installation portion
260: air injection port 300: contact member
310: ball housing 311: tool groove
312: cooling hole 320: contact ball
330: retainer 400, 400': elastic member
500, 500', 500": cutting tool unit
511, 511', 511": fixed block 512, 512", 512"': straight movement block
513, 513', 513": elastic block
530, 530' 530": cutting tip
600, 600', 600": micro advance and retreat member 610: piezo
620: connection shaft 630: retreat member
631: bushing 632: Belleville spring
633: lock nut 700: cooling block
800, 800': height difference sensing sensor
900, 900': centrifugal force supplement member

What is claimed is:

1. A cutting head operated by a centrifugal force comprising:
an external housing that is rotatable;
an internal housing installed within the external housing and configured to advance and retreat in a diameter direction, wherein the internal housing advances toward a cut surface of a workpiece positioned outside the external housing by a centrifugal force to generated by rotation of the external housing and retreats away from the cut surface by an elastic force of an elastic member installed on the internal housing when the centrifugal force is decreased by slowdown of the rotation of the external housing; and
a cutting tool unit provided in the internal housing and processing a groove in the cut surface while being advanced and retreated by a micro advance and retreat member which is electrically driven to move in a scale smaller than the movement of the internal housing.

2. The cutting head operated by a centrifugal force of claim 1, further comprising:
a contact member provided in the internal housing and provided with a tip contacting the cut surface when the internal housing advances to the cut surface,
wherein the cutting tool unit is advanced and retreated by the micro advance and retreat member in a state in which the tip of the contact member is first in contact with the cut surface.

3. The cutting head operated by a centrifugal force of claim 1, wherein: the internal housing is provided with guide rollers installed on each side surface of the internal housing for reducing friction between the internal housing and the external housing when the internal housing advances and retreats in a state in which the interval housing closely contacts an inner surface of the external housing by wedges.

4. The cutting head operated by a centrifugal force of claim 1, further comprising:
a centrifugal force supplement member pushing the internal housing toward the cut surface.

5. The cutting head operated by a centrifugal force of claim 1, wherein:
the cutting tool unit includes:
a straight movement inducing block seated in the internal housing and advanced and retreated by the micro advance and retreat member;
a tool holder block seated on the straight movement inducing block and induced to straightly move by the straight movement inducing block; and
a cutting tip supported to the tool holder block and forming the groove in the cut surface of the workpiece.

6. The cutting head operated by a centrifugal force of claim 5, wherein:
the straight movement inducing block includes:
fixed blocks fixed to the internal housing;
a straight movement block advanced and retreated by power of the micro advance and retreat member; and
elastic blocks elastically connecting the fixed blocks and the straight movement block to each other so that straight movement of the straight movement block is induced.

7. The cutting head operated by a centrifugal force of claim 6, wherein:
the elastic blocks have a plate-shaped structure, notch portions having a thickness smaller than that of other portions are formed at end portions of the elastic blocks connected to the fixed blocks and the straight movement block, and the elastic blocks are elastically deformed by the notch portions.

8. The cutting head operated by a centrifugal force of claim 5, wherein:
the cutting tip is supported to the tool holder block so as to be rotatable on its axis, and rotates on its axis by a cutting moment generated at the time of cutting the workpiece.

9. The cutting head operated by a centrifugal force of claim 8, wherein:
the tool holder block includes:
a first holder block provided with a seating groove on which the cutting tip is seated and provided with a tip shaft disposed at one side of the seating groove and loosely coupled to a shaft hole of the cutting tip;
a second holder block supporting a part of the cutting tip; and
a pressing member elastically pressing the cutting tip toward the first holder block 521 with being installed in the second holder block.

10. The cutting head operated by a centrifugal force of claim 8, wherein:
when viewing the cutting tip on a plane, an extension line of the cutting tip in a diameter direction is disposed so as to form an acute angle with respect to an extension line of the external housing in a rotation shaft direction.

11. The cutting head operated by a centrifugal force of claim 2, wherein:
the contact member includes:
a ball housing screwed into the internal housing to be capable of adjusting a protrusion degree thereof from the internal housing according to a rotation operation;
a contact ball embedded in a tip of the ball housing so as to be partially exposed to be in contact with the cutting surface by the centrifugal force of the external housing;
a retainer supporting a lower part of the contact ball with being slidably installed in the ball housing; and
a lifting bolt supporting the retainer within the ball housing and screwed to an inner peripheral surface of the ball housing to lift the retainer toward the contact ball according to a rotation operation.

12. The cutting head operated by a centrifugal force of claim 6, wherein:
the micro advance and retreat member includes a piezo-actuator, and
the piezo-actuator includes:
a piezo having one end grounded to the straight movement block and the other end grounded to the internal housing and advancing the straight movement block while being expanded in a length direction when power is applied thereto;
a connection shaft connecting the straight movement block and the internal housing to each other and advanced in an advance direction of the straight movement block in conjunction with the expansion of the piezo; and a retreating member retreating the straight movement block by pulling the connection shaft when the piezo is powered off.

13. The cutting head operated by a centrifugal force of claim 1, further comprising:
a stopping block installed in the external housing and limiting a maximum advance distance of the internal housing,
wherein the cutting tool unit
is installed at a central portion of the internal housing and is advanced toward the cut surface by the micro advance and retreat member in a state in which the internal housing is stopped by the stopping block.

14. The cutting head operated by a centrifugal force of claim 13, wherein:
the internal housing has a hexahedral shape, and a surface of the internal housing on which the cutting tip is disposed and a back surface thereof have a square shape.

15. The cutting head operated by a centrifugal force of claim 14, further comprising:
guide rollers provided on support surfaces having chamfered forms of rectangular corners sides of the internal housing and arranged symmetrically to each other with respect to the cutting chip while intersecting with each other in a diagonal direction.

16. The cutting head operated by a centrifugal force of claim 13, wherein:
the stopping block includes:
a pair of block bodies coupled to both sides of the internal housing installation unit, respectively;
stoppers each provided on the pair of block bodies and limiting an advance distance of the internal housing; and
constraint rods each provided on the pair of block bodies and preventing separation of the elastic member.

17. The cutting head operated by a centrifugal force of claim 16, wherein:
the stoppers are configured so that protrusion degrees thereof from each of the pair of block bodies are adjusted.

18. The cutting head operated by a centrifugal force of claim 6, wherein:
the straight movement block is supported on all sides thereof by the elastic blocks so that a degree of freedom is limited in remaining directions excluding a straight movement direction.

19. The cutting head operated by a centrifugal force of claim 18, wherein:
the straight movement block has a rectangular shape, and
the elastic blocks are disposed at each corner of the straight movement block having the rectangular shape and are disposed in an oblique direction so as to be symmetrical to each other with respect to a center of the straight movement block.

20. A cutting apparatus comprising:
the cutting head operated by a centrifugal force of claim 1;
a buffer unit coupled to a distal end of the cutting head and including a buffer chamber keeping an air pressure of air introduced into the cutting head constant; and
a main body unit coupled to a distal end of the buffer unit and including first and second air supply ports supplying air to the cutting head and the buffer chamber and a control unit controlling an advance and retreat distance of the micro advance and retreat member.

* * * * *